INVENTORS
GEORGE W. SWISHER JR.,
GORDON L. SPIVEY &
BY ADOLPH R. PETERSIK

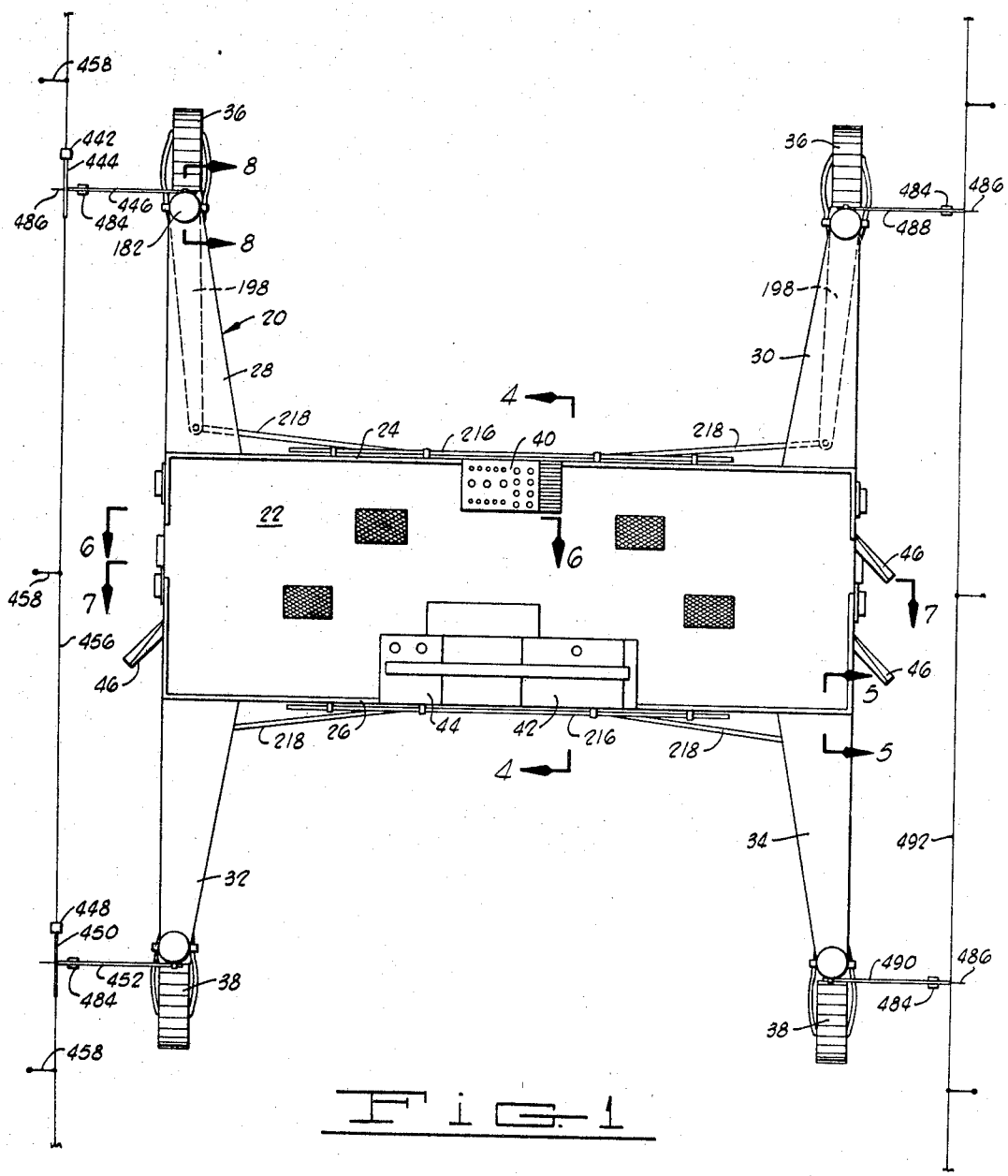

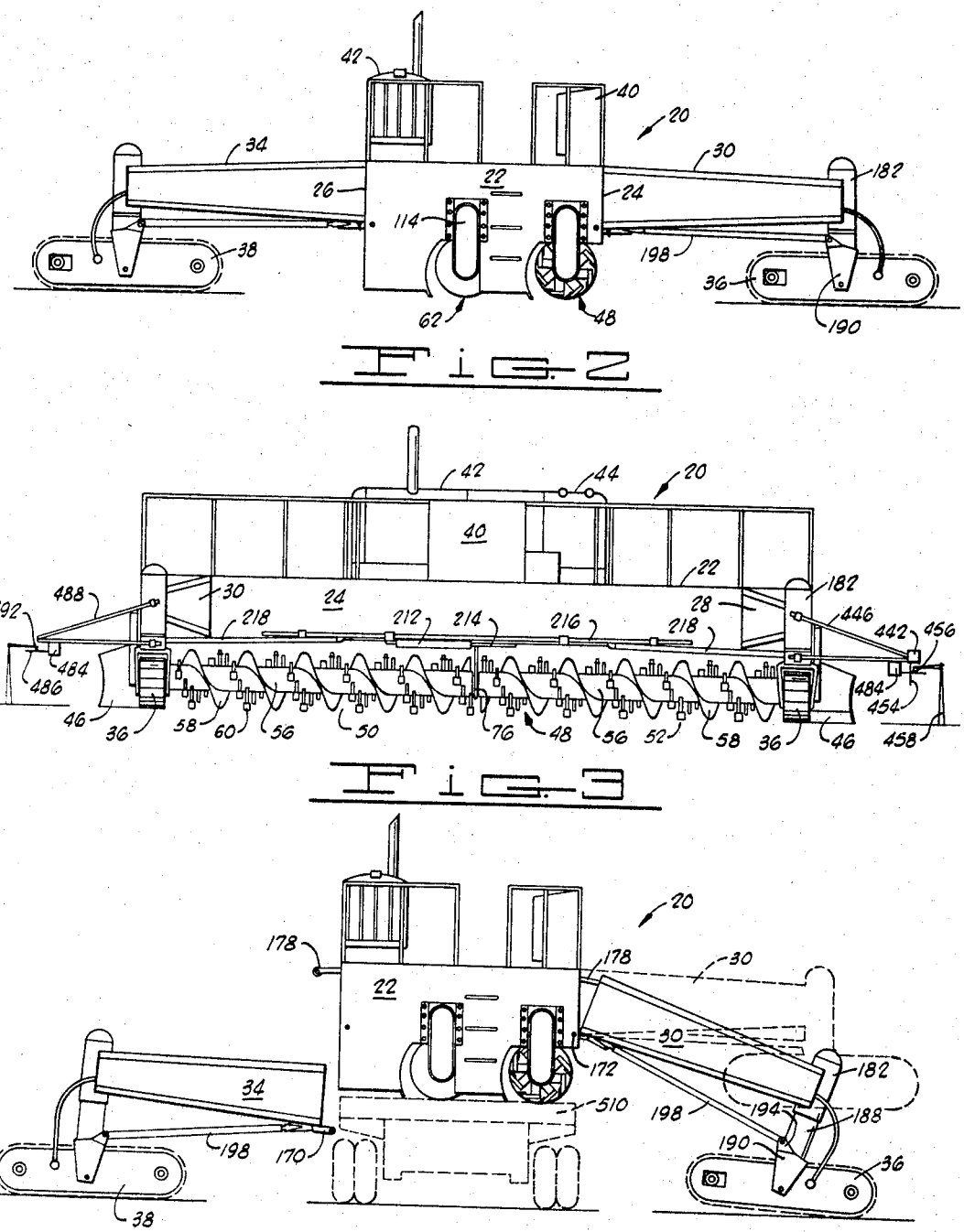

ATTORNEYS

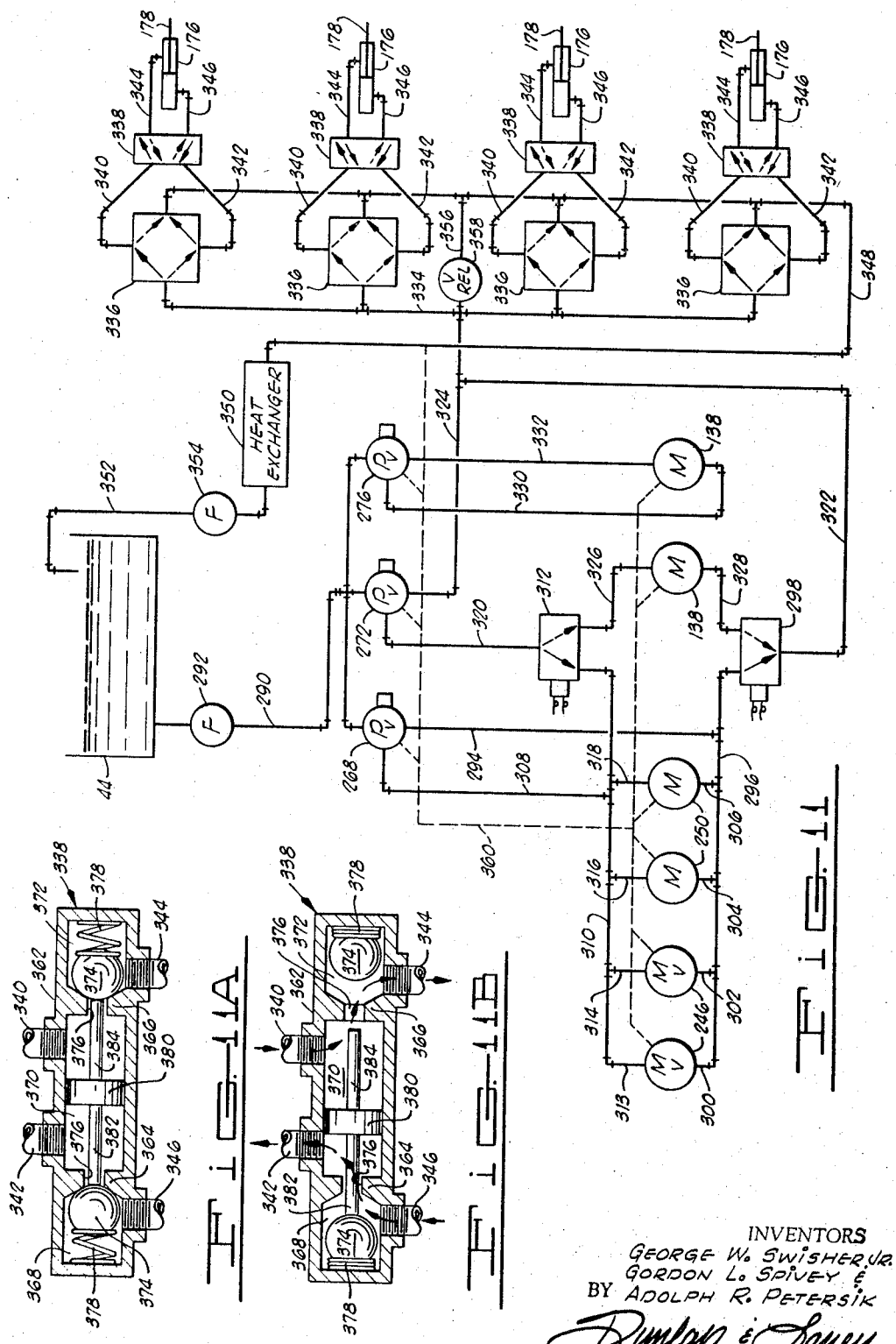

United States Patent Office 3,423,859
Patented Jan. 28, 1969

3,423,859
ROAD CONSTRUCTION METHODS AND APPARATUS
George W. Swisher, Jr., Gordon L. Spivey, and Adolph R. Petersik, Oklahoma City, Okla., assignors to Construction Machinery, Inc., Oklahoma City, Okla., a corporation of Oklahoma
Filed Apr. 7, 1965, Ser. No. 446,239
U.S. Cl. 37—108                                27 Claims
Int. Cl. E02f 5/02, 3/06, 3/24

ABSTRACT OF THE DISCLOSURE

Self-propelling road construction apparatus for cutting and leveling road way subgrades, the apparatus consisting of a central frame carrying vertically adjustable cutting and dirt-moving implements and being propelled by a suitable power source acting through spaced traction elements. The apparatus embodies further novel facets as to interconnection and control of the major elements in a manner which enables rapid adjustment and disassembly for highway transport by such as conventional truck bed carriers.

---

This invention relates generally to improved methods and apparatus for constructing roadbeds and the like. More particularly, but not by way of limitation, this invention relates to an improved self-loading construction machine and to an improved method for constructing roadbeds and the like.

The usual method of constructing a paved road or the like involves the steps of (1) surveying the terrain over which the road is to extend, (2) establishing a reference line or elevation for controlling the grade, curves, elevation, etc., of the road; (3) making a rough grade cut utilizing standard construction equipment, such as bulldozers and roadgraders; (4) spreading and rolling one or more layers of base material over the roadbed; (5) trimming the surface of the base material; and (6) placing paving material, such as asphalt or concrete, over the base material.

Many different types of machines have been developed for performing each of the foregoing steps accurately and quickly in an effort to reduce the cost of producing a finished road. For example, a slip-form machine has been developed for automatically depositing concrete on the surface of the roadbed. The slip-form machine includes means for automatically controlling the elevation of the upper surface of the concrete relative to the reference line established by the survey. While the slip-form machine provides a satisfactory means for spreading the concrete and controlling the elevation of the upper surface thereof, the inability to accurately control the elevation of the surface of the base materials and the grade cut forces the paving contractors to lay a greater thickness of concrete than is required to be certain that the concrete material will be at least the minimum thickness required in the paving contract in all places. This practice has proved to be extremely expensive and at times has cost several hundred thousand dollars over a relatively short length of roadbed.

Therefore, it was perceived that some means must be provided to more accurately control the grade cut and the elevation of the final trimmed base material in order to conserve the amount of concrete used in paving the road. Several machines have been developed and placed on the market that seek to perform the aforestated grading and trimming operation. These machines generally involve the use of a rotating cutter member that extends across the roadbed, a conveyor for moving the material cut by the rotating cutter off the roadbed, and a control system that is basically the same as used on the slip-for machines for controlling the elevation of the cutter relative to the reference line or elevation. These machines are used to make the final grade cut after the rough grade cut has been made by conventional graders and also to trim the base material after it has been spread and rolled.

Several disadvantages have been inherent in the machines previously constructed. For example, they will make a satisfactory final cut provided that the rough grade cut is above the reference elevation. Stated in another way, these machines have been capable of removing material, but have not been capable of filling depressions in the event that the rough grade cut may be below the reference elevation.

Also, previously constructed machines have been cumbersome, slow moving, and extremely difficult to transport from one location on the roadbed to another and from one construction site to another. It is extremely important that such machines be easily transportable from one location on the road project to another so that the machine may be efficiently utilized in the construction of the road. Due to the magnitude of road paving projects, it is generally necessary that the road be constructed in stages, that is, while the rough cut is being made on one end of the road, the other end thereof may be ready for the surfacing material to be laid. Therefore, it is highly desirable to be able to use the machine to make the final grade cut immediately behind the rough grade cut then transport the machine to an area where the base material has been rolled to trim the base material immediately so that the surfacing material may be spread thereon without delay.

Due to the relatively slow travel of such large machines, the foregoing has been extremely difficult and time consuming. In previously constructed machines, either the machine had to be completely disassembled, which required a matter of days, or moved to the new area under its own power which was extremely slow and, because of the size of the machine, often interfered with the operation of other construction equipment operating in the roadbed. For the foregoing reasons, previously constructed machines have not been entirely satisfactory.

This invention generally provides an improved road construction machine including a central frame having a rotatable cutter member mounted thereon for trimming the surface of the roadbed and, at times, conveying the trimmed material to one side of the roadbed; a rotatable auger mounted on the central frame relatively behind the rotatable cutter member for removing excess materials from the roadbed and for conveying materials thereacross to fill any depressions that may exist in the roadbed below the reference elevation; power means mounted on the central frame for rotating the cutter member and the auger; a plurality of spaced track support members having one end connected with the central frame and extending outwardly therefrom; and track means located on the other end of each of support members for supporting the machine on the ground.

More specifically, one embodiment of the invention also contemplates having the support members pivotally connected with the central frame and means mounted on the frame for rotating the support members to raise and lower the central frame relative to the surface of the roadbed, whereby it can be conveniently self-loaded.

The invention also contemplates a method of loading the machine including the steps of energizing the support member rotating means to raise the frame, positioning transportion means under the frame, and energizing the support member rotating means to lower the frame onto the transportation means.

The invention also contemplates a method of constructing a roadbed that includes trimming the surface thereof extending above a selected reference elevation, conveying the material removed from the roadbed by trimming to at least one side of the roadbed; moving the trimmed material from said one side across the roadbed to fill depressions in the surface below the reference elevation; and, removing excess materials from the surface whereby the roadbed will be at the reference elevation.

One object of the invention is to provide an improved apparatus and method for constructing roadbeds.

Another object of the invention is to provide an improved roadbed construction machine that is self-loading.

A further object of the invention is to provide a method of loading and unloading machines.

Still another object of the invention is to provide an improved method for economically and efficiently constructing roadbeds to a reference elevation.

One further object of the invention is to provide an improved construction machine that removes material from the surface of a roadbed above the reference elevation and fills depressions in the roadbed below the reference elevation.

Another object of the invention is to provide an improved construction machine that can be self-propelled at a relatively rapid speed.

A still further object of the invention is to provide an improved self-propelled, self-loading construction machine that may be quickly and easily transported from one area to another.

One other object of the invention is to provide an improved self-propelled construction machine having a central frame and a plurality of track support members extending therefrom wherein the central frame may be loaded upon transportion means by rotating the track support members relative thereto and wherein the track support members can be quickly and easily disconnected from the central frame for loading on the transportation means.

The foregoing and additional objects and advantages of the invention will become more apparent as the following description is read in conjunction with the accompanying drawings wherein like reference characters denote like parts in all views and wherein:

FIG. 1 is a top plan view of a construction machine constructed in accordance with the invention;

FIG. 2 is a side elevation view of the construction machine of FIG. 1;

FIG. 3 is a front elevation view of the construction machine of FIG. 1;

FIG. 6 is a cross-sectional view of the construction machine of FIG. 1, taken along the lines 6—6 of FIG. 1;

FIG. 7 is a cross-sectional view of a portion of the construction machine of FIG. 1, taken along the lines 7—7 of FIG. 1;

FIG. 8 is a cross-sectional view of a portion of the construction machine of FIG. 1, taken along the lines 8—8 of FIG. 1;

FIG. 11A is a cross-sectional view of a safety valve utilized in the hydraulic circuit illustrated in FIG. 11;

FIG. 11B is a view similar to FIG. 11A, but showing the valve in another operating position;

FIG. 19 is an elevation view illustrating the self-loading feature of the construction machine.

Figure 4:
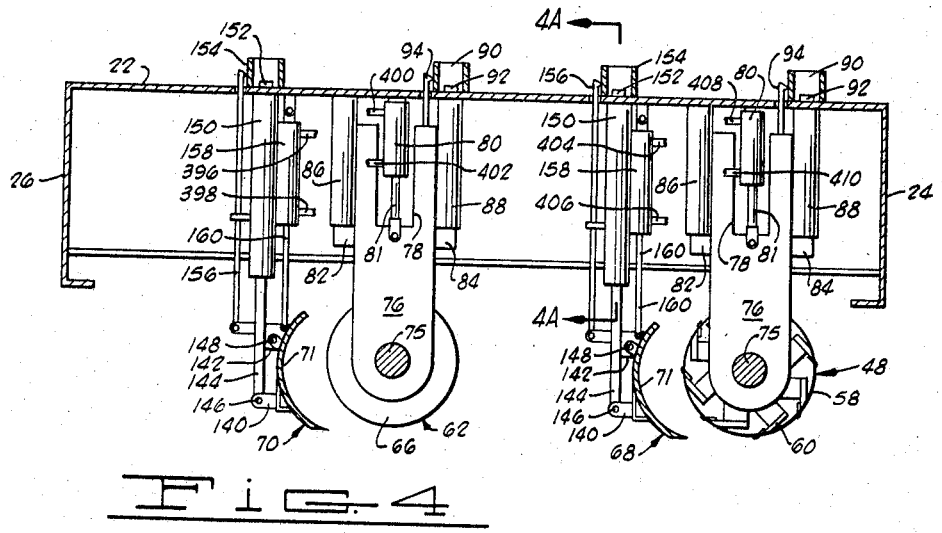
FIG. 4 is a cross-sectional view of a portion of the construction machine of FIG. 1, taken along the lines 4—4 of FIG. 1.

Referring to the drawings and to FIGS. 1, 2 and 3, in particular, shown therein and generally designated by the reference character 20 is a machine constructed in accordance with the invention. The machine 20 includes a central frame 22 having a front side 24 and a rear side 26. A pair of spaced track support members 28 and 30 extend forwardly from the front side 24 of the central frame 22 and are pivotally connected thereto as will be described more fully hereinafter. Similarly, a pair of track support members 32 and 34 extend rearwardly from the rear side 26 of the central frame 22 and are pivotally connected thereto also as will be described more fully hereinafter. Mounted on the extreme forward end of the track support members 28 and 30 are a pair of identical track assemblies 36 and mounted on the track support members 32 and 34 are a pair of identical track assemblies 38. In the preferred form of the machine 20, the track assemblies are driven (as will be described) so that the machine 20 is self-propelled.

Mounted on the upper surface of the central frame 22 is a control console 40. Also mounted on the upper surface of the central frame 22 is an engine 42 for providing power to the various operating components of the machine 20 and a hydraulic fluid reservoir 44. Mounted on each end of the central frame 22 is a plurality of short angularly disposed deflectors 46 for purposes that will become more apparent hereinafter.

As shown in FIGS. 2, 3 and 4, a rotatable cutter assembly, generally designated by the reference character 48, is mounted for vertical movement on the central frame 22 adjacent the front side 24 thereof. As shown most clearly in FIG. 3, the cutter assembly 48 comprises a pair of cutter members 50 and 52 disposed in end-to-end relationship. Each of the cutter members 50 and 52 comprises a central shaft 56 having a helical vane or flight 58 thereon and a plurality of cutter teeth 60 helically arranged in parallel relationship with the helical flights 58. In the preferred form of the invention and as illustrated in FIG. 3, each of the cutter members 50 and 52 have the helical flights 58 and the cutter teeth 60 thereon arranged in the same direction about the central shafts 56.

Also mounted for vertical movement on the central frame 22 is an auger generally designated by the reference character 62. The auger 62 may be seen in FIGS. 2 and 4, and more clearly in FIG. 7. The auger 62 is constructed in a manner similar to the cutter 48, but does not include the helically arranged cutter teeth 60. As illustrated in FIG. 7, the auger 62 includes a pair of central shafts 64 arranged in end-to-end relationship and having a helical flight 66 encircling each of the shafts 64. It will be noted in FIG. 7 that the flight 66 is reversed in pitch on one shaft 64 as compared to the other.

As shown in FIG. 4, front and rear moldboards 68 and 70, respectively, are mounted for vertical movement on the central frame 22. The front moldboard 68 is disposed immediately to the rear of the cutter 48 and the rear moldboard 70 is disposed immediately to the rear of the auger 62. The moldboards 68 and 70 are identically constructed and, as illustrated in FIG. 6, each includes a pair of moldboard members 72 and 74 disposed in end-to-end relationship and each having a concave front surface 71 for cooperation with the adjacent cutter 48 or auger 62.

The methods used to mount the cutter 48 and auger 62 are identical; therefore, only the mounting of the auger 62 in the central frame 22 will be described in detail. As shown in FIG. 7, adjacent ends of the shafts 64 are provided with self-aligning bearings 73 that are sized to receive stub shafts 75. The stub shafts 75 are rigidly attached to a shaft support plate 76 that may be more clearly seen in FIG. 4.

As shown most clearly in FIG. 4, the support plate 76 has a notch 78 sized to receive a double-acting hydraulic cylinder 80. The hydraulic cylinder 80 is connected at its upper end with the central frame 22. A piston 81, reciprocally mounted in the hydraulic cylinder 80, extends from the cylinder 80 and is connected at the exposed end with the support plate 76.

The support plate 76 includes a pair of guide members 82 and 84 that extend upwardly into a pair of tubular guide sleeves 86 and 88, respectively, that are sized to receive the guide members 82 and 84. The upper ends of the sleeves 86 and 88 are rigidly attached to the frame 22. The arrangement is such that the support plate 76 and auger 62 are limited to vertical movement relative to the central frame 22. The guide sleeves 86 and 88 are slotted (not shown) on the side adjacent the support member 76 so that the guide members 82 and 84 may be joined to the support plate 76 generally along their full length.

Mounted on the upper surface of the central frame 22 is a short cylindrical tube 90 that is positioned coaxially with the tubular guide sleeve 88. The tube 90 provides a guard for the head of an adjusting screw 92 that forms part of an adjustable stop mechanism similar to the mechanism that will be described more fully in connection with FIG. 4A. The exterior of the tube 90 is provided with a series of vertical graduations (not shown) that cooperate with an indicator rod 94 mounted on the support plate 76 to indicate the position of the auguer 62 relative to the central frame 22.

As may be perceived from viewing FIG. 7, the outboard ends of the auger 62 are supported in an identical manner and, therefore, only one will be described in detail. The outboard ends of each of the shafts 64 are journaled in a self-aligning bearing 96 that is mounted on a support plate 98 disposed adjacent the ends of the central frame 22. Also mounted on the plate 98 in vertically-spaced relation to the shaft 64 is a drive shaft support member 100. The drive shaft support member 100 includes a rigid frame 102 carrying a drive shaft 104 journaled therein by a pair of spaced bearings 106.

A drive sprocket 108 is mounted on the outboard end of the drive shaft 104. An endless drive chain 110 extends from the drive sprocket 108 to a sprocket 112 mounted on the shaft 64. The sprockets 108 and 112 and the chain 110 are covered by a chain cover 114 that may be mounted on the plate 98 or on the end of the central frame 22 as desired. The plate 98 is slidable vertically relative to the end of the frame so that the drive shaft 104 and the shaft 64 are held in fixed, spaced relation to maintain tension on the chain 110.

To raise and lower the outboard ends of the auger 62, a double-acting hydraulic cylinder 116 is connected at one end with the central frame 22. A piston 118 reciprocally mounted in the cylinder 116 has its projecting lower end connected with the drive shaft support member 100. To insure that the movement of the outboard ends of the auger 62 will be in a vertical direction, a guide member 120 is rigidly attached at its lower end to the top of the shaft support member 100 and is sized to telescope into a guide tube 122 that has its upper end rigidly attached to the central frame 22.

The guide tube 122 and guide member 120 also include an adjustable stop mechanism similarly constructed to the mechanism that will be described in detail in connection with FIG. 4A. However, the head of an adjusting screw 124 of the stop mechanism can be seen immediately above the central frame 22 and is encircled by a short cylindrical tube 126. The cylindrical tube 126 is identical in all respects to the cylindrical tube 90 described in connection with the mounting arrangement of the center of the shafts 64. Also, there is provided an indicator rod 128 extending upwardly from the drive shaft support 100 to a position adjacent the short cylindrical tube 126 to indicate the location of the outboard ends of the auger 62 relative to the central frame 22.

Providing a separate adjustable stop on each of the outboard ends, as well as in the center, of the auger 62 permits the positioning of the uger 62 so that a crown can be formed in the roadbed if desired. Stated in another way, the screws 124 on the outboard ends of the auger 62 can be adjusted to a lower position than the screw 92 in the center of the auger 62 so that the auger members 62 will be disposed at an angle relative to the surface of the roadbed with the center thereof being higher than the outboard ends.

The other end of each of the drive shafts 104 is connected by a universal joint 130 to a telescoping shaft 132. The opposite end of the telescoping shaft 132 is connected by a universal joint 134 to the output shaft 136 of a hydraulic motor 138. The hydraulic motor 138 is rigidly mounted on the frame 22, and, if desired, may also include a speed reducing transmission (not shown). The hydraulic motor 138 is operably connected with a hydraulic pump (to be described later) whereby the hydraulic motor 138 is caused to rotate thereby rotating the auger 62 through the sprockets 108 and 112 and chain 110.

Due to the identical construction of the moldboards 68 and 70 only the moldboard 70 will be described in detail with reference being made to FIGS. 4 and 6. As previously mentioned, the moldboard 70 includes a pair of moldboard members 72 and 74 mounted in end-to-end relationship. The moldboards 68 and 70 are each mounted for vertical movement in the central frame 22 at a central point which is common to the adjacent interior ends of each of the moldboard members 72 and 74 and at a point spaced therefrom whereby the load exerted by each of the moldboard members 72 and 74 will be equally distributed on the frame 22.

The adjacent ends of each of the members 72 and 74 is provided with a lower mounting bracket 140 (see FIG. 4) and with an upper mounting bracket 142. The lower and upper mounting brackets 140 and 142, respectively, are connected with a guide member 144 by a lower pin 146 and an upper pin 148. The guide member 144 extends upwardly into a cylindrical guide sleeve 150 that has its upper end rigidly attached to the central frame 22. The specific construction of the telescoping arrangement between the guide member 144 and the cylindrical guide sleeve 150 will be described more fully in connection with FIG. 4A.

The head of an adjusting screw 152 can be seen protruding above the central frame 22. A short tube 154 is mounted on the surface of the frame 22 coaxially with the cylindrical guide member 150 and serves the same purposes as the cylindrical tube 90 previously described. An indicator rod 156 is connected to the guide member 144 and extends upwardly therefrom through the central frame 22 adjacent the exterior of the tube 154 as was described in connection with the indicator rod 94.

A double-acting hydraulic cylinder 158 has its upper end connected with the central frame 22 and is disposed in parallel relationship with the cylindrical guide member 150. A reciprocal piston 160 mounted in the cylinder 158 has its lower, projecting end connected with the upper mounting bracket 142 whereby actuation of the piston 160 within the cylinder 158 raises and lowers the moldboard 70.

It should be understood that the mechanism for guiding and for raising and lowering the outboard ends of the moldboards 68 and 70 is identical to the centrally located mechanisms described, except that each of the outboard mechanisms is connected only to a single one of the adjacent moldboard member 72 or 74. Therefore, the same reference characters will be used when referring to the outboard guide mechanisms as used in connection with the center guide mechanism described in detail.

Figure 4A:
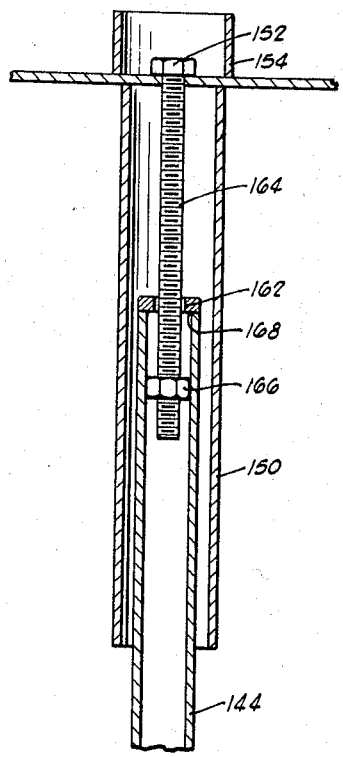
FIG. 4A is a vertical cross-sectional view of a portion of the construction machine, taken along the lines 4A—4A of FIG. 4.

FIG. 4A illustrates the details of construction of the adjustable stop mechanism for limiting the downward travel of the moldboards 68 and 70, which mechanism is identical in structure and similar in function to the adjustable stop mechanism used to adjust the vertical positions of the auger 62 and cutter 48. As illustrated therein, the guide member 144 is slidingly received in the cylindrical guide sleeve 150. The upper end of the guide member 144 is provided with an opening 162 sized to loosely receive a threaded shank 164 of the adjusting screw 152. A threaded adjusting nut 166 is threadedly engaged with the threaded shank 164 of the adjusting screw 152 and is sized to be closely received within the guide member 144. The arrangement is such that the adjusting nut 166 cannot rotate within the guide member 144, but is slidable therein.

As the guide member 144 moves downwardly in the cylindrical guide sleeve 150, a downwardly facing shoulder 168 on the upper end of the guide member 144 engages the adjusting nut 166 to arrest the downward movement thereof. The vertical position of the adjusting nut 166 may be varied on the threaded shank 164 by rotating the adjusting screw 152 since the adjusting nut 166 cannot rotate within the guide member 144. Therefore, it is possible to position the adjusting nut 166 along the threaded shank 164 to accurately and selectively adjust the vertical position of the cutter 48, auger 62, and moldboards 68 and 70.

Figure 5:
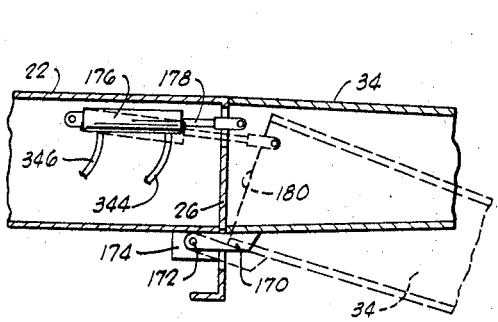
FIG. 5 is a cross-sectional view of a portion of the machine of FIG. 1, taken along the lines 5—5 of FIG. 1.

The details of the structure connecting the track support members 28, 30, 32 and 34 to the central frame 22 are illustrated in FIG. 5. As shown therein, each of the track support members (only the representative member 34 is illustrated) is provided with one or more pivot arms 170 on the lower portion thereof. The arms 170 are pivotally connected by a removable pin 172 with mating brackets 174 that are rigidly connected with the frame 22.

For each of the track support members there is provided a double-acting hydraulic cylinder 176 that has one end pivotally attached to the central frame 22. A reciprocating piston 178 mounted in the cylinder 176 has its projecting end pivotally connected with the adjacent track support member. As illustrated in FIG. 5, the pivotal connection between the piston 178 and the track support member 34 is located relatively near the top side of the support member 34, whereby movement of the piston 178 in the cylinder 176 causes the track support arm 34 to pivot about the pivot pin 172 into a position illustrated by the dash lines. It should be noted that, the normal operating position of the support arm 34 is as illustrated by the solid lines with the end 180 of the track support member 34 in abutting relationship with the adjacent side of the central frame 22. The pivot pin 172 is preferably constructed for easy removal from the assembly so that the track support members can be removed from the central frame 22 without difficulty.

FIG. 8 illustrates in greater detail, the method of connecting the track assemblies 36 and 38 to the track support members 28, 30, 32 and 34. Due to the identical manner in which the track assemblies are connected, only the connection between the track assembly 36 and the support member 28 is illustrated. As shown, a tubular member 182 is rigidly connected with the extreme end of the track support member 28 so that the axis of the tube 182 extends substantially vertically and generally perpendicularly to the longitudinal axis of the track support member 28. The upper end of the tube 182 is closed by a cap 184 having a cylinder support bracket 186 welded thereto.

A tubular guide member 188 has the upper end portion thereof sized to fit closely within the tubular member 182 and has the lower end thereof attached to a bifurcated yoke 190 that is connected with the track assembly 36 by a pintal pin 192. The guide member 188 is both slidable and rotatable in the tubular member 182. Connected with the upper end of the yoke 190 is a pair of spaced, upwardly extending lugs 194 (only one is shown in FIG. 8). Pivotally connected with the lugs 194 by a pin 196 is a steering arm 198 that forms part of a mechanism for steering the track assemblies and the machine 20. The steering mechanism will be described in detail hereinafter.

A double-acting hydraulic cylinder 200, having its upper end connected with the cylinder support bracket 186, is located in the tubular member 182 and extends coaxially therewith. A reciprocating piston 202 is positioned in the hydraulic cylinder 200 and has the projecting lower end thereof connected with the yoke 190.

As illustrated, the connection between the piston 202 and the yoke 190 is made by extending a reduced end portion 204 on the piston 202 through an aperture 206 in the yoke 190 so that an abutment 208 formed by the reduced end portion 204 of the piston 202 engages the upper surface of the yoke 190. A nut 210 is threaded on the portion 204 until it engages the lower surface of the yoke 190. With the arrangement described, it can be seen that movement of the piston 202 in the hydraulic cylinder 200 raises or lowers the track support arm 28 relative to the track assembly 36.

The mechanism for steering the machine 20 comprises two identical systems, one being provided for steering the front track assemblies 36 and the other being provided for steering the rear track assemblies 38. The steering systems can best be seen in FIGS. 1, 2 and 3.

As shown in FIG. 3, a double-acting hydraulic cylinder 212 is mounted on the front side 24 of the central frame 22 and has a reciprocating piston 214 mounted therein. The projecting end of the piston 214 is connected to a steering member 216 that is slidably mounted on the front side 24 of the frame 22. The steering member 216 is pivotally connected with a pair of radius arms 218 that extend angularly therefrom into pivotal connection with the steering arms 198 (see FIG. 1). Movement of the piston 214 moves the steering member 216 and the connected radius arm 218 causing the steering arms 198 to pivot. Pivotation of the steering arms 198 pivots the yoke 190 and, by virtue of the pintle pin 192 (see FIG. 8), also pivots the associated track assembly 36 or 38 to guide the machine 20 in the desired direction.

Figure 9:
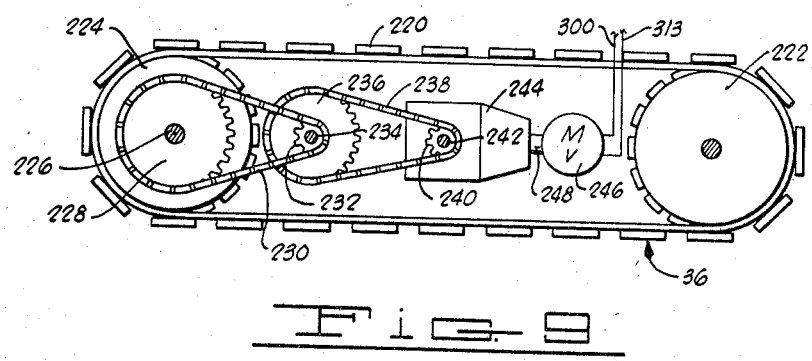
FIG. 9 is a schematic diagram illustrating the method of driving the tracks of the construction machine of FIG. 1.

FIG. 9 illustrates schematically the arrangement and apparatus incorporated in the track assemblies 36 and 38 for propelling the machine 20. As shown therein, the track drive system includes a conventional endless flexible track 220 extending around an idler sprocket 222 and a drive sprocket 224. It should be understood that the idler sprocket 222 is arranged in a conventional manner for adjusting the tension in the track 220.

The drive sprocket 224 is mounted on a shaft 226 also carrying a relatively large chain sprocket 228. An endless chain 230 extends around the sprocket 228 and around a smaller sprocket 232 that is mounted on a shaft 234. A sprocket 236 that is relatively larger than the sprocket 232 is also mounted on the shaft 234. A chain 238 extends around the sprocket 236 and around a relatively small sprocket 240 mounted on the output shaft 242 of a mechanical speed reducer 244.

A hydraulic motor 246 is connected by a shaft 248 with the speed reducer 244 so that the track 220 is driven through the mechanism described by the hydraulic motor 246. The use of the illustrated sprocket and chain drive, along with the mechanical speed reducer 244 provides a speed reduction from the shaft 248 to the shaft 226 of approximately 63 to 1, whereby the hydraulic motor 246 can be operated at a relatively high speed to develop sufficient power in the tracks 220 for propelling the machine 20.

The hydraulic motor 246 utilized in the track assemblies 36 is a variable displacement type motor to permit varying the speed thereof even though the hydraulic pumps (to be later described) which drive the motor are operated at a constant speed. In a preferred form of constructing the machine 20, a constant displacement hydraulic motor 250 (see FIG. 11) is used in the track assemblies 38 in lieu of the variable displacement hydraulic motor 246. The motors 246 and 250 are commercially available from the New York Air Brake Co., of Watertown, N.Y.

Figure 10:
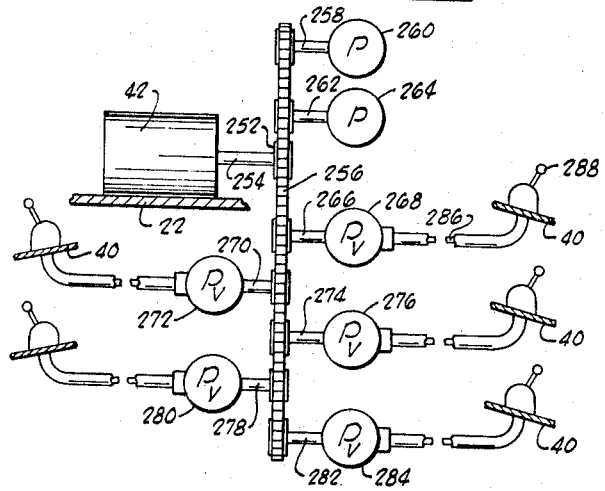
FIG. 10 is a schematic diagram illustrating the driving connection between an engine mounted on the construction machine and a plurality of pumps also mouted thereon.

Without going into a detailed description of the hydraulic circuits, which will be described later, FIG. 10 illustrates schematically the connection between the engine 42 and the various pumps utilized in the invention.

As shown in FIG. 10, a sprocket 252 is mounted on an output shaft 254 of the engine 42 and is drivingly connected by conventional chain sprockets and a chain 256 with a shaft 258 of a hydraulic pump 260, a shaft 262 of a hydraulic pump 264, a shaft 266 of a variable displacement hydraulic pump 268, a shaft 270 of a variable displacement hydraulic pump 272, a shaft 274 of a variable displacement pump 276, a shaft 278 of a variable displacement hydraulic pump 280, and a shaft 282 of a variable displacement hydraulic pump 284.

The variable displacement pumps 268, 272, 276, 280 and 284 are commercially available from the New York Air Brake Co. of Watertown, N.Y. Each of these pumps includes a mechanical cable 286 that extends from the pumps to a manually operated control lever 288 mounted on the control console 40. The lever 288 can be manually adjusted to mechanically vary the displacement of the pumps, reverse the direction of fluid flow from the pumps, and to stop the fluid flow altogether. Internally, each of the variable displacement pumps also includes a small makeup pump for purposes which will become more apparent hereinafter.

As may be perceived from the preceding description, a preferred form of constructing machine 20 incorporates many hydraulically actuated and controlled devices. However, it should be understood that it is within the contemplation of the invention that in some less preferred embodiments of the invention, the hydraulic components described may be replaced by equivalent electrical, mechanical or pneumatic apparatus.

Figure 11:
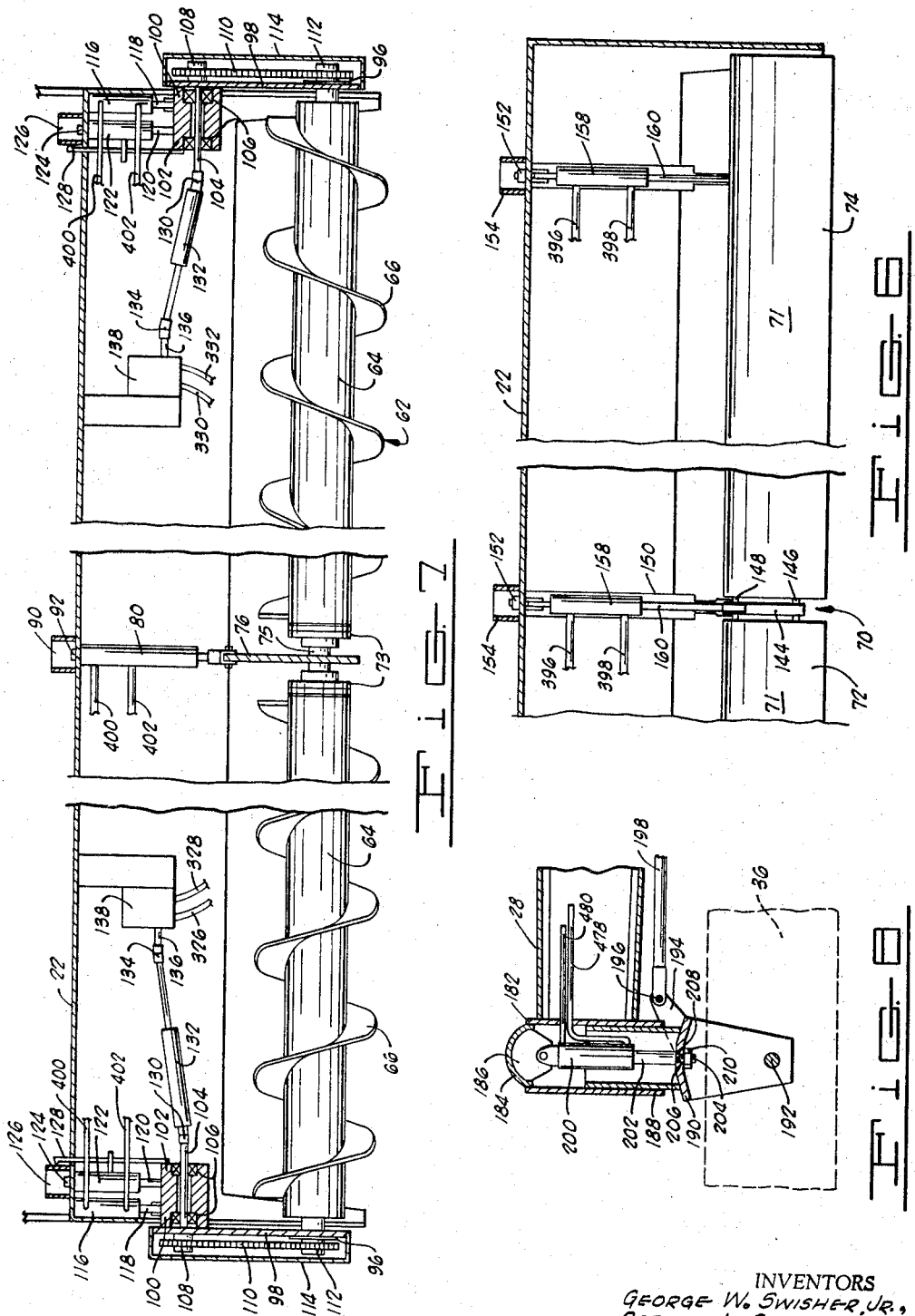
FIG. 11 is a schematic diagram of a hydraulic circuit utilized in the construction machine of FIG. 1.

FIG. 11 is a schematic diagram illustrating the hydraulic systems utilized for propelling the machine 20, rotating the cutter 48, and pivoting the track support members 28, 30, 32 and 34 relative to the frame 22. As illustrated therein, the variable displacement pumps 268, 272 and 276, that have previously been described as being drivingly connected with the engine 42, are connected in fluid communication with the reservoir 44 by a conduit 290. As previously mentioned, each of the variable displacement pumps includes a small makeup pump (not shown) and it is to this makeup pump that the conduit 290 is actually connected. Interposed in the conduit 290 between the variable displacement pumps and the reservoir 44 is a filter 292 that is provided to remove any foreign matter that may be contained in the hydraulic fluid.

A conduit 294 extends from the pump 268 and is connected with a conduit 296. The conduit 296 has one end in fluid communication with a selector valve 298. The other end of the conduit 296 is connected by branch conduits 300 and 302 with the variable displacement hydraulic motors 246 mounted in the track assemblies 36 and by branch conduits 304 and 306 with the hydraulic motors 250 mounted in the track assemblies 38. A conduit 308 extends from the pump 268 into connection with a conduit 310 which has one end connected with a second selector valve 312 and has the other end connected by branch conduits 313 and 314 with the variable displacement hydraulic motors 246 mounted in the track assemblies 36 and by branch conduits 316 and 318 with the hydraulic motors 250 mounted in the track assemblies 38. Thus, it can be seen that the circuit described provides a means of utilizing the pump 268 to drive the hydraulic motors 246 and 250, which drive the tracks 220 to propel the machine 20. The machine 20 may be driven in either direction upon reversing the flow of fluid from the hydraulic pump 268 by means of the lever 288 as previously described.

A conduit 320 extends from the pump 272 to the second selector valve 312. A conduit 322 extends from the first selector valve 298 and has the other end thereof connected to a conduit 324 that has one end connected with the pump 272.

As illustrated in FIG. 11, the selector valves 298 and 312 are solenoid operated valves, electrically interconnected (not shown) so that they can be simultaneously actuated by a single switch (not shown). The valves 298 and 312 are arranged internally so that the flow through the valves will be either in the direction of the solid arrows or the direction of the dash arrows. The selector valves 298 and 312 may be manually, pneumatically, or hydraulically actuated in lieu of the solenoid actuation illustrated.

As the hydraulic circuit associated with the pump 272 has been described thus far, it can be seen that if the selector valves 298 and 312 are positioned so that the flow therethrough is in the direction of the solid arrows, the pump 272 will move hydraulic fluid through the motors 246 and 250 to argment the fluid supplied by the pump 268. Normally, the pump 272 will be used to drive the motors 246 and 250 only when the machine 20 is to be moved at a relatively high speed.

The selector valve 312 is also connected with the hydraulic motor 138 used to drive the cutter member 50 by a conduit 326. The motor 138 is connected by a conduit 328 with the first selector valve 298. Therefore, the pump 272 may be utilized to drive the cutter member 50 when the selector valves 298 and 312 are positioned so that the flow therethrough follows the dash arrows.

The other cutter member 52 is driven by the variable displacement pump 276. As may be seen in FIG. 11, the pump 276 is connected to the second hydraulic motor 138 by conduits 330 and 332.

The other end of the conduit 324 is connected to a conduit 334 that is connected with 4 four-way valves designated by the reference character 336. The four-way valves 336 are standard commercially available valves internally arranged to provide fluid flow therethrough either in the direction of the solid arrows or the dash arrows as illustrated in FIG. 11. Each of the four-way valves 336 is connected with a safety valve 338 by a pair of conduits 340 and 342. The valves 338 are shown in detail in FIGS. 11A and 11B and will be described in detail in connection with those figures.

Each of the safety valves 338 is connected with the respective double-acting hydraulic cylinders 176 by conduits 344 and 346. The respective conduits 344 and 346 are connected with each cylinder 176 so that fluid may be delivered to either side of the piston 178. As previously described in connection with FIG. 5, the hydraulic cylinders 176 are mounted in the central frame 22 and the piston 178 therein is connected with the adacent track support member whereby movement of the piston 178 causes the track support member to rotate vertically relative to the frame 22.

A conduit 348 is connected with each of the four-way valves 336 and extends therefrom to a heat exchanger 350. The heat exchanger 350 is connected with the reservoir 44 by a conduit 352. As illustrated, a second filter 354 is interposed in the conduit 352 between heat exchanger 350 and the reservoir 44. It should be pointed out that the heat exchanger 350 and the second filter 354 may be omitted from the circuit if desired.

A conduit 356 extends between the conduits 334 and 348 and has a relief valve 358 located therein. The relief valve 358 is provided so that the pressure imposed by the pump 272 on the hydraulic cylinders 176 can be limited to a predetermined maximum valve.

It will be observed in FIG. 11 that a conduit generally designated by the reference character 360 and shown in dash lines has one end connected with the conduit 348 and is connected with each of the pumps 268, 272, and 276, and with each of the motors 246, 250, and 138. The conduit 360 is provided so that any fluid which may leak into the case or housing of the various pumps and motors will flow into the conduit 348 for return to the reservoir 44. Leakage into the housing of the pumps and motors does not affect the operation of the hydraulic circuits because the makeup pump (not shown) provided in each of the pumps 268, 272 and 276 delivers fluid from the reservoir 44 through the conduit 290 into the pumps to restore the fluid lost.

As shown in FIGS. 11A and 11B, the safety valves 338 each incldue a valve body 362 having a pair of spaced valve seats 364 and 366 dividing the valve body 362 into three chambers 368, 370 and 372. The chambers 368 and 372 are identical in construction and each has a valve ball 374 positioned therein for engagement with the respective valve seat 364 or 366 to close apertures 376 extending therethrough. Also, a compression type spring 378 is positioned in each of the chambers 368 and 372 to bias the valve balls 374 into engagement with the seats 364 and 366. The conduit 346 is connected with the chamber 368 and the conduit 344 is connected with the chamber 372.

The conduits 340 and 342 are connected with the chamber 370 on either side of a reciprocating piston 380 positioned therein. As illustrated, the piston 380 includes a pair of oppositely disposed rod portions 382 and 384 projecting therefrom and into the apertures 376.

FIG. 11B illustrates the valve 338 in the position the parts therein will occupy when the flow through the valve 338 is as illustrated by the solid arrows. Fluid flowing under pressure, through the conduit 340 enters the chamber 370, moving the piston 380 in the direction shown so that the rod portion 382 engages the valve ball 374 positioned in the chamber 368, dislodging the valve ball 374 from the seat 364. Simultaneously, the fluid pressure in the chamber 370 moves the ball 374 in the chamber 372 away from the seat 366, permitting fluid flow from the chamber 370 into the conduit 344 to the cylinder 176. Since the valve ball 374 in the chamber 368 is also off the seat 364, fluid flows from the conduit 346 into the chamber 368 from the cylinder 176 outwardly through the conduit 342.

If the conduit 340 should rupture, or should pressure cease to exist in the chamber 370 for any reason, the spring 378 in the chamber 368 drives the valve ball 374 and the piston 380 back to the position illustrated in FIG. 11A, wherein both valve balls 374 are seated on their respective seats 364 and 366 preventing flow through the valve 338 from either conduit 344 or 346. The valves 338 serve to lock the pistons 178 (see FIG. 11) in a fixed position in the cylinders 176 should pressure decrease in either the conduit 340 or the conduit 342.

Figure 12:
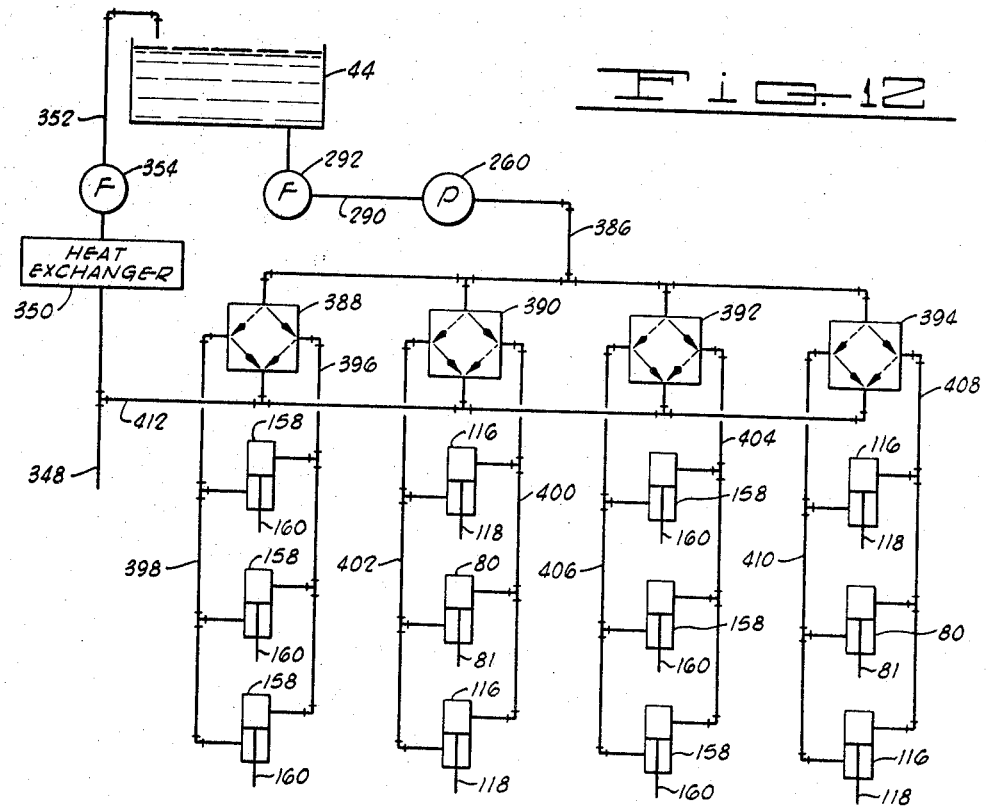
FIG. 12 is a schematic diagram of a hydraulic circuit utilized in raising and lowering the moldboards, auger and cutter located in the construction machine of FIG. 1.

The hydraulic circuit associated with the cylinders 80 and 116 for raising and lowering the cutter 48, the auger 62, and the hydraulic cylinders 158 for raising and lowering the moldboards 68 and 70 is illustrated schematically in FIG. 12. As shown therein, the pump 260 is connected with the reservoir 44 by the conduit 290. A conduit 386 connects the pump 260 with four four-way valves 388, 390, 392 and 394.

The four-way valves are standard commercially available valves internally arranged to provide for fluid flow therethrough either in the direction indicated by the solid arrows or by the dash arrows in FIG. 12. A conduit 396 extends from the four-way valve 388 to each of the cylinders 158 associated with the rear moldboard 70. A conduit 398 also extends from the four-way valve 388 to provide fluid communication with the cylinders 158. The arrangement of the conduits 396 and 398 is such that the fluid will be selectively supplied to the cylinders 158 on either side of the reciprocating pistons 160 mounted therein.

A conduit 400 extends from the four-way valve 390 to the hydraulic cylinders 80 and 116 that are used to raise and lower the auger 62. A conduit 402 also extends from the four-way valve 390 to the hydraulic cylinders 80 and 116. The conduits 400 and 402 are connected with the cylinders 80 and 116 on either side of the reciprocating pistons 81 in the cylinders 80 and the pistons 118 in the cylinders 116, so that the respective pistons can be selectively caused to move in one direction or the other in response to pressure applied in the conduits.

A conduit 404 extends from the four-way valve 392 to the hydraulic cylinders 158 utilized to raise and lower the front moldboard 68. A conduit 406 also extends from the four-way valve 392 to the hydraulic cylinders 158. The conduits 404 and 406 are connected with the hydraulic cylinders 158 so that fluid may be selectively directed therethrough to either side of the reciprocating pistons 160.

A conduit 408 extends from the four-way valve 394 to the hydraulic cylinders 80 and 116 that are used to raise and lower the cutter 48. A conduit 410 also extends from the four-way valve 394 to the cylinders 80 and 116. The conduits 408 and 410 are connected with the cylinders 80 and 116 so that pressure in the conduits 408 and 410 can be selectively applied to either side of the pistons 81 and 118 in the cylinders 80 and 116, respectively, to raise or lower the cutter 48.

A conduit 412 is connected with each of the four-way valves 388, 390, 392 and 394 and has the other end thereof connected with the conduit 348, whereby fluid may be returned from the four-way valves to the reservoir 44 by way of the heat exchanger 350 and the conduit 352. From the foregoing description, it can be seen that the cutter 48, the auger 62, and the front moldboard 68 and the rear moldboard 70 can be independently raised or lowered by positioning the associated four-way valve so that the flow therethrough either follows the solid arrows or the dash arrows illustrated in FIG. 12.

Figure 13:
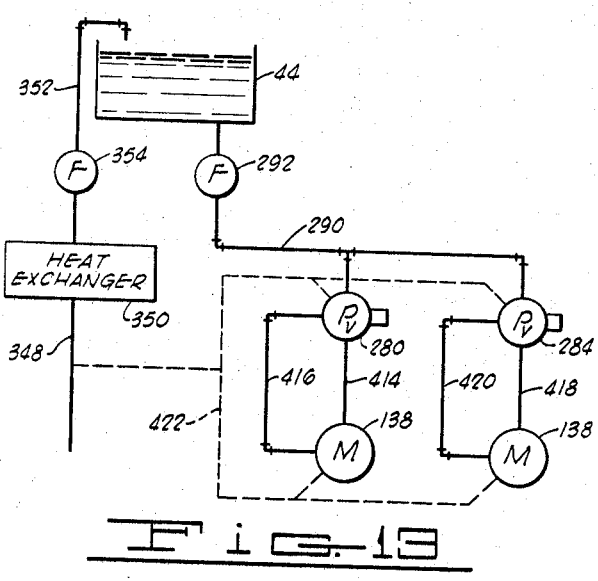
FIG. 13 is a schematic diagram of a hydraulic circuit utilized to drive an auger in the construction machine of FIG. 1.

FIG. 13 is a schematic diagram of another hydraulic circuit utilized in the construction machine 20 for rotating the auger 62. As shown therein, the variable displacement pumps 280 and 284 are connected with the reservoir 44 by the conduit 290. The pump 280 is connected with the motor 138 by a pair of conduits 414 and 416. Similarly, the pump 284 is connected with another motor 138 by a pair of conduits 418 and 420. As previously described in connection with FIG. 10, each of the pumps 280 and 284 is connected with a lever 288 mounted on the control console 40. The volume of the pump output can be varied as well as reversing the fluid flow from the pumps, whereby the motors 138 can be driven in either direction and at varying speeds by the pumps 280 and 284. The conduit 422, indicated in dash lines in FIG. 13, is connected with the pumps 280 and 284, the motors 138 and with the conduit 348. The conduit 422 is connected with the housing of the pumps and the motors so that any leakage occurring within the pumps and motors will return to the reservoir 44 through the conduit 422, the conduit 348 and the conduit 352.

Figure 14:
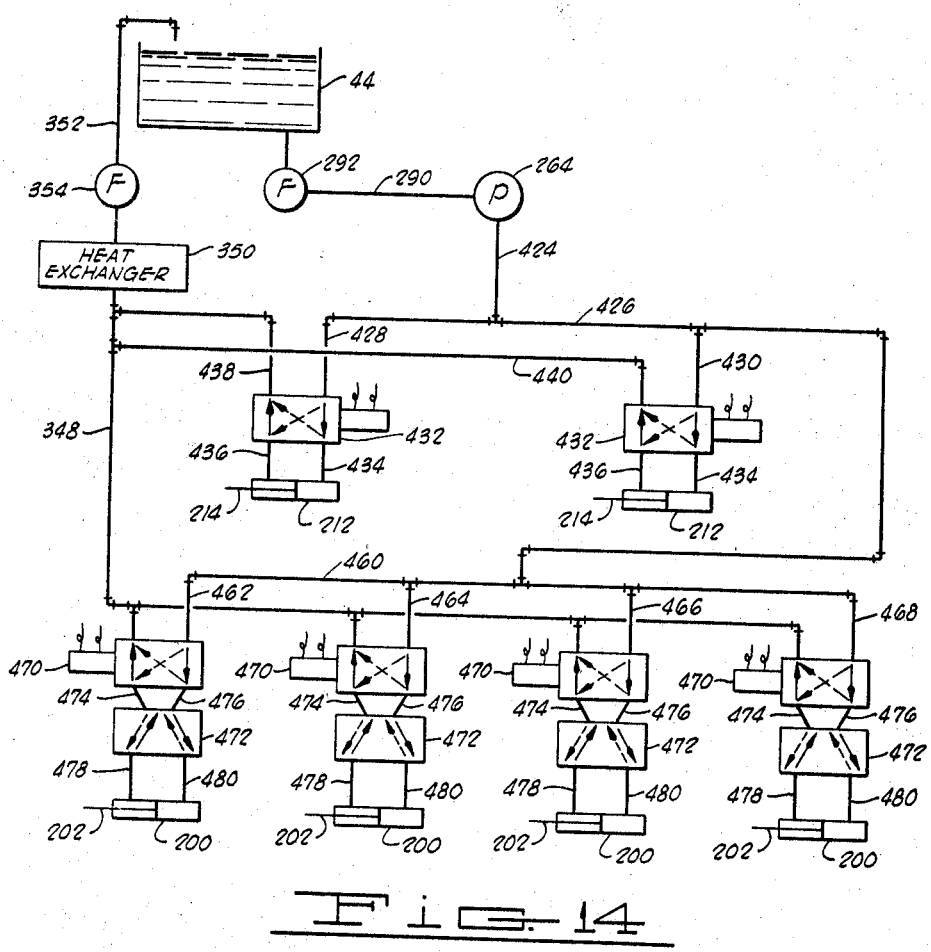
FIG. 14 is a schematic diagram of a hydraulic circuit utilized in the leveling and steering systems of the construction machine of FIG. 1.

FIG. 14 schematically illustrates a hydraulic circuit for steering and leveling the machine 20. As shown therein, the pump 264 is connected with the reservoir 44 by the conduit 290. A conduit 424 has one end connected to the pump 264 and the other end connected to a conduit 426. The conduit 426 is connected by branch conduits 428 and 430 with a pair of solenoid-actuated four-way valves 432. The solenoid-actuated valves 432 are standard commercially available valves that are internally arranged to provide for flow therethrough in either the direction shown by the solid arrows or in the direction shown by the dash arrows.

A conduit 434 extends from each of the four-way valves 432 to the hydraulic cylinders 212 used for steering the machine 20. A second conduit 436 extends from each of the four-way valves 432 to the cylinders 212 so that the pistons 214 located in the cylinders 212 may be moved in either direction depending on the position of the four-way valves 432. A conduit 438 extends from one of the four-way valves 432 to provide fluid communication therefrom into the conduit 348 that is connected to the reservoir 44 by the conduit 352. Similarly, a conduit 440 extends from the other four-way valve 432 to the conduit 348.

Referring again to FIGS. 1 and 3, shown therein is a steering sensor 442 mounted on a horizontal elongated bar 444 that is connected to the track support member 28 by an A-frame 446. Similarly, a steering sensor 448 is mounted on an identical horizontal bar 450 that is attached to the track support member 32 by an A-frame 452. As shown most clearly in FIG. 3, the sensors 442 and 448 include a sensing arm 454 that extends downwardly into engagement with a control wire 456. The control wire 456 is supported by a plurality of posts 458 that are spaced along either side of the roadbed in which the machine 20 is operating. The position of the control wire 456 is established by the road survey and installed accordingly prior to the use of the machine 20.

The steering sensors 442 and 448 are electrically connected (not shown) to the solenoid-actuated four-way valves 432. The arrangement is such that the sensor 442 actuates the steering cylinder 212 mounted on a front side 24 of the frame 22 through the valve 432 to control the direction of movement of the machine 20 through the track assemblies 36. Similarly, the sensor 448 assists in controlling the direction of movement of the machine 20 through the track assemblies 38. A suitable electrical system for controlling the steering of the machine 20 is illustrated in U.S. Patent No. 2,907,398 issued to R. M. Gunnert and W. F. Early on Oct. 6, 1959.

To maintain the machine 20 in the desired attitude, determined by the survey, the conduit 426 is also connected with a conduit 460 (see FIG. 14) that is connected by branch conduits 462, 464, 466 and 468 with four solenoid-actuated, four-way valves 470. The solenoid-actuated four-way valves 470 are standard commercially available valves internally arranged to provide flow therethrough in a direction indicated by either the direction of the solid arrows or the dash arrows as shown in FIG. 14. Each four-way valve 470 is connected by a pair of conduits 474 and 476 to a safety valve 472, that is identical in construction and operation to the safety valve 338 described in FIGS. 11A and 11B. Each of the safety valves 472 is connected with one of the hydraulic cylinders 200 by a pair of conduits 478 and 480 so that fluid can be delivered selectively to either side of the reciprocating piston 202 mounted in the respective cylinder 200. As previously described, the cylinders 200 are mounted at the free ends of each of the track support members 28, 30, 32 and 34 and are arranged to move the respective track support member vertically relative to the track assemblies 36 or 38.

Referring again to FIGS. 1 and 3, it can be seen that a leveling sensor 484 is mounted on the A-frame 446 and has a horizontally extending sensing member 486 extending therefrom into engagement with the control wire 456. An identical sensor, also designated by the reference character 484, is mounted on the A-frame 452 located on the track support member 32. Two other identical sensors 484 are located on A-frames 488 and 490 that are mounted on the track support arms 30 and 34, respectively. Each of the additional sensors 484 also include the horizontally extending sensing members 486 that project into engagement with a second control wire 492 extending along the opposite side of the roadbed, and parallel to the control wire 456.

The sensors 484 are each electrically interconnected (not shown) with the solenoid-actuated valve 470 that is connected with the cylinder 200 located in the adjacent track support member. The arrangement of the sensors 484 is such that they control the vertical position of each of the track support members relative to its attached track assembly when electrically connected as described in U.S. Patent No. 2,907,398 issued to R. M. Gunnert and W. F. Early on Oct. 6, 1959.

OPERATION

It will be recalled from the foregoing description that the preferred form of the machine 20 is self-propelled. Also, as previously described, the machine 20 is propelled by the track assemblies 36 and 38. To propel the machine 20, the engine 42 is started and, by virtue of the chain 256, starts the pumps 260, 264, 268, 272, 276, 280 and 284 to rotating.

The basic method of driving the tracks 220 located on the track assemblies 36 and 38 is to move the lever 288 associated with the variable displacement pump 268 to a position wherein the pump 268 delivers fluid through the conduit 308 to the motors 246 and 250. From the motors 246 and 250, the fluid returns through the conduits 296 and 294 to the pump 268. Thus, it can be seen that the pump 268 rotates the motors 246 and 250 which cause the rotation of the tracks 220 through the drive linkage previously described. The speed of the machine 20 may be varied by moving the lever 288 which changes the volume of fluid displaced by the pump 268 to cause more or less fluid to flow through the motors 246 and 250.

If additional power or speed is required in the machine 20, the selector valves 298 and 312 are positioned so that fluid therethrough will be in the direction of the solid arrows shown in FIG. 11. The pump 272, which is already rotating as previously described, delivers fluid into the conduit 320 upon movement of the lever 288 associated therewith, through the selector valve 312 into the conduit 310 augmenting the flow through the conduit 308 from the pump 268 to the motors 246 and 250. Fluid is returned through the conduit 296, the conduit 294 and to the pump 268, the selector valve 298, the conduit 322 and the conduit 324 to the pump 272. Thus, it can be seen that both the pumps 268 and 272 can be utilized to deliver fluid to the motors 246 and 250.

If the machine 20 is to be moved from one location on the job site to another, it is possible to increase the speed of the machine 20 by varying the displacement of the motors 246 so that they do not function to drive the tracks 36. When the motors 246 are in this condition, it can be seen that all of the fluid from the pumps 268 and 272 drive the two motors 250 located in the track assemblies 38. The provision of the additional fluid supply into only two of the motors approximately doubles the speed of the machine 20.

It can be appreciated from the foregoing that the machine 20 has three distinct speeds aside from the variation in speeds available by varying the displacement of pumps 268 and 272. For example, if the pumps 268 and 272 are set at maximum volume displacement by the associated levers 288, the machine 20 will have one speed when only the pump 268 is driving the motors 246 and 250; it will have approximately twice that speed when the pump 272 is augmenting the pump 268 in driving the motors 246 and 250; and it will have approximately four times that speed when the motors 246 receive no fluid as described so that the two motors 250 receive the entire volume from the combined pumps 268 and 272.

The method of steering the machine 20 is believed evident from the foregoing description, but to summarize briefly, the sensing arms 454 (see FIG. 3) engage the guide wire 456 so that a signal is transmitted from the sensors 442 and 448 to their associated solenoid-actuated valves 432. The valves 432 are then positioned in accordance with the signal received to direct fluid therethrough in either the direction of the solid arrows or dash arrows, as shown in FIG. 14, to the cylinder 212 to which they are connected. As will be recalled, one of the cylinders 212 is mounted on the front side 24 of the vehicle 20 and the other cylinder 212 is mounted on the rear side 26 of the machine 20.

Fluid is delivered from the pump 264 through the conduit 426 and into the solenoid valves 432 into either of the conduits 434 or 436 to move the piston 214 in the cylinder 212 in the appropriate direction in accordance with the signal transmitted by the sensors 442 and 448. As can be appreciated from viewing FIGS. 1 and 3, the piston 214 moves the slidable steering member 216 that, in turn, moves the radius arm 218 to position the steering arms 198 and the track assemblies 36 or 38 to which they are connected in the appropriate direction. That is, the ends of the steering arms 198 adjacent the central frame 22 and connected with the track assemblies 36 and 38 are moved to the left (as seen in FIG. 1) to steer the machine 20 to the right, and, conversely, the ends of the steering arms 198 adjacent the central frame 22 are moved to the right to steer the machine 20 to the left. Thus, it can be seen that the machine 20, due to the influence of the sensors 442 and 448, will follow a course defined by the control wire 456.

To assure that the machine 20, that is, the cutter 48, moldboards 68 and 70, and auger 62, maintain a vertical position defined by the control wires 456 and 492, the sensors 484 are mounted on each of the track support arms 28, 30, 32 and 34 with the sensor rods 486 thereon in engagement with the control wires 456 and 492. As previously described, each of the sensors 484 is electrically connected with the solenoid-actuated valve 470 that is hydraulically interconnected with one of the cylinders 200 mounted in the adjacent track support member.

As the machine 20 travels over the roadbed, movement of the track assemblies 36 or 38, in the vertical direction in response to variations in the roadbed surface moves the associated sensor 484 therewith and relative to the control wires 456 and 492. Upon movement of the sensors 484 relative to the wires 456 and 492, a signal is transmitted from the sensors 484 to the associated solenoid-actuated, four-way valves, whereupon fluid flows from the pump 264 through the valve 470 in either the direction indicated in the solid arrows or the dash arrows (see FIG. 14) through the conduits 478 or 480 to move the piston 202 in one direction or the other in the cylinder 200. The movement of the piston 202 is in a direction opposite to the vertical movement of the track assemblies 36 or 38 so that the central frame 22 will be maintained at the desired elevation relative to the control wires 456 and 492 regardless of the position of the track assemblies 36 and 38.

Positioning of the cutter 48 is accomplished by rotating the adjusting screws 92 and 124 while the cutter 48 is in the raised position to limit the downward travel of the cutter 48. To lower the cutter 48, the four-way valve 394 is positioned so that fluid is directed therethrough as shown by the solid arrows in FIG. 12. That is, fluid from the pump 260 flows through the conduit 86 into the four-way valve 394 and through the conduit 408 to the cylinders 116 and 80 so that the pistons 118 and 81 are driven downwardly until their travel is arrested by the stop mechanism.

Similarly, the auger 62 is positioned by rotating the adjusting screws 92 and 124 while the auger 62 is in the raised position. The four-way valve 390 is then positioned so that fluid flows from the pump 260 through the conduit 86, through the valve 390 into the conduit 400 and then into the cylinders 116 and 80 which are connected with the auger 62. The downward travel of the pistons 118 and 81 in the cylinders 116 and 80, respectively, continues until the stop mechanism arrests the downward travel thereof.

The front moldboard 68 and rear moldboard 70 are similarly positioned by rotating the adjusting screws 152 to position the adjusting nut 166 in the desired position to engage the guide member 144 thereby limiting the downward travel of the moldboards. Downward movement of the moldboards 68 and 70 is accomplished by positioning the four-way valves 392 and 388, respectively, so that the flow therethrough is in the direction of the solid arrows as seen in FIG. 12. With the valves 392 and 388 in this position, fluid flows through the pump 260, through the conduit 386 to the valves 392 and 388, into the conduits 404 and 396, respectively, into the cylinders 158 associated with the respective moldboards, thereby driving the pistons 160 downwardly. The downward movement of the pistons 160 continues until the downwardly facing shoulder 168 (see FIG. 4A) in the guide member 144 engages the adjusting nut 166, whereupon the downward movement is arrested.

Upward movement of the cutter 48, auger 62 and front and rear moldboards 68 and 70 is accomplished by positioning the valves 394, 392, 390 and 388 so that the fluid flow therethrough will be in the direction indicated by the dash arrows in FIG. 12. With the valves in this position, it can be seen that fluid will be directed from the pump 260 through the conduit 386 in the respective four-way valves into the conduits 410, 406, 402 and 398 into the cylinders connected thereto, to drive the pistons upwardly in the cylinders and, consequently, to raise the cutter 48, auger 62, and moldboards 68 and 70.

If it is desired that the entire surface of the roadbed be constructed at a single elevation, that is, in a single plane, the adjusting screws 92, 124 and 152 will all be adjusted to a position wherein the indicators 94, 126 and 156 will indicate that each of the members is located an equal distance from the central frame 22. If it is desired to form a crown in the roadbed, that is, if the center of the roadbed is to be at a higher elevation than the elevation of either side thereof, the adjusting screws 92 and the center adjusting screw 152 on the moldboards 68 and 70 will be positioned so that the adjusting nuts therein will engage the respective guide members prior to the engagement of the adjusting nuts with the guide members in the outboard adjusting screws 124 and 152. Such an arrangement permits greater travel in the outboard cylinders with the result that the outboard ends of the cutter members 50 and 52, the auger 62 and the moldboards 68 and 70 are at a lower elevation than the respective center portions thereof.

As mentioned in connection with the detailed description of FIG. 7, the cutter 48 and auger 62 are driven in identical fashion, however, the hydraulic circuits associated therewith are constructed somewhat differently. The hydraulic circuit for rotating the cutter 48 is illustrated in a portion of FIG. 11.

The cutter member 50 is driven by the pump 272 by positioning the lever 288 associated with the pump 272 so that fluid will be delivered therefrom into the conduit 320 through the selector valve 312, which has been repositioned so that fluid flow therethrough is in the direction of the dash arrow shown in FIG. 11, through the conduit 362 to the motor 138. Fluid flowing through the motor 138 passes through the conduit 328 through the selector valve 298, which has also been repositioned so that flow therethrough is in the direction of the dash arrow, through the conduit 322 into the conduit 324 from which it is returned to the pump 272. Due to the provision of the selector valves 298 and 312, the pump 272 may be selectively used for driving either the hydraulic motors 246 and 250 associated with the track assemblies 36 and 38, or to drive the motor 138 connected with the cutter member 50.

The cutter member 52 is driven by the variable displacement pump 276 upon actuation of the lever 288 associated therewith. Fluid is pumped from the pump 276 through the conduit 322, through the motor 130 and back to the pump 276 through the conduit 330.

The auger 62 is caused to rotate by the motors 138 connected therewith as described in FIG. 7. The hydraulic circuit for driving the motors 138 is shown in FIG. 13 and, as shown therein, each end of the auger 62 is independently driven. The pump 280, upon actuation of the lever 288 associated therewith, pumps fluid through the conduit 414, through the motor 138 and back to the pump 280 through the conduit 416. Similarly, the other end of the auger 62 is caused to rotate by the pump 284 which, upon actuation of the lever 288 associated therewith, delivers fluid through the conduit 418, through the motor 138 and then back to the pump 284 through the conduit 420. Due to the reversibility of the fluid flow from the pumps 280 and 284, the motors 138 and either end of the auger 62 may be driven in either direction as desired.

Figure 15:
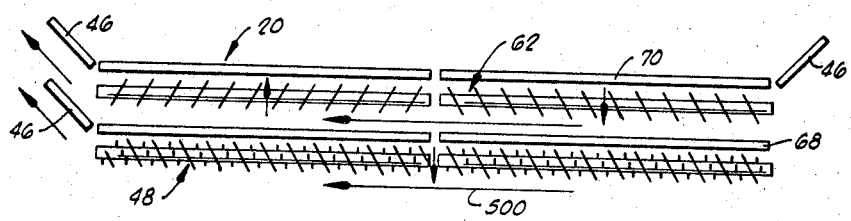
FIGS. 15, 16, 17 and 18 are schematic diagrams illustrating various operating arrangements of the cutter, auger, and moldboards mounted in the construction machine illustrated in FIG. 1.

The machine 20, constructed in accordance with the invention, can be utilized in many different ways. For example, if the machine 20 is being used to trim the surface of the roadbed or to trim the base material, the cutter 48, front moldboard 68, auger 62, and rear moldboard 70 may each be lowered to the desired finished elevation of the roadbed. As the machine 20 progresses forwardly, with the cutter 48 rotating, material removed from the roadbed is moved to the right of the machine as illustrated by the arrow 500 in FIG. 15 so that all material removed from the roadbed is deposited on the right side thereof. Any material that passes underneath the front moldboard 68 is picked up by the counter-rotating ends of the auger 62 which cooperate with the rear moldboard 70 to move the material to the right side of the roadbed as shown in FIG. 15. Two deflectors 46, arranged on the right side of the machine 20, assure that the dirt moved by the cutter 48 and the auger 62 will be clear of the finished roadbed.

Figure 16:
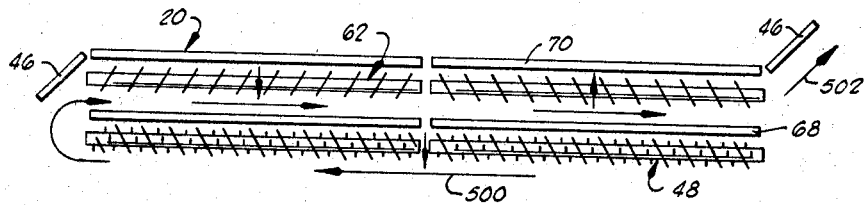

In the usual use of the machine 20, there will be some portion of the surface of the roadbed above the reference elevation and some below the reference elevation so that it is desirable to be able to remove the high portions and fill the low portions. As shown schematically in FIG. 16, material removed from the surface of the roadbed by the cutter 48 is conveyed to the righthand side thereof as shown by the arrow 500 where it is picked up by one of the deflectors 46, which has been reversed, and directed thereby into the auger 62. The auger 62 has been reversed in direction of rotation by removing the appropriate control levers 288 to reverse direction of fluid flow from the pumps 280 and 284. The rotation of the auger 62 is now in the opposite direction as compared to the direction of rotation illustrated in FIG. 15. Rotation in this direction conveys the dirt from the righthand side of the roadbed to the lefthand side thereof. With this arrangement, the cutter 48 functions to remove any portion of the roadbed above the reference elevation and the auger 62 transmits the dirt removed in the reverse direction across the roadbed to fill any depression therein. All of the dirt is deposited by the auger 62 on the lefthand side of the roadbed as indicated by the arrow 502 in FIG. 16. The rear moldboard 70 cooperates with the auger 62 to convey the dirt as described as well as to trim any filled depressions to the reference elevation.

Figure 17:
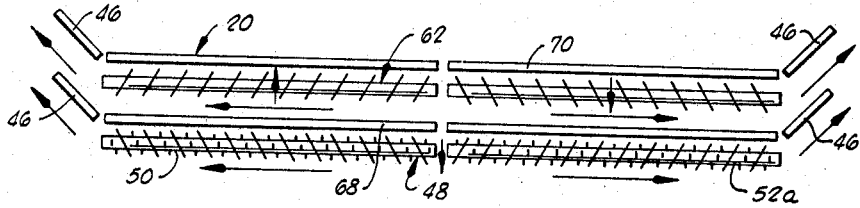

FIG. 17 illustrates schematically, a slightly modified version of the machine 20. In the modified embodiment, the lefthand cutter member 52 has been replaced by a cutter member 52a having the flights and cutter teeth thereon arranged in a helical configuration opposite to the helical configuration of the righthand cutter 50. An arrangement of this type may be highly desirable where a large amount of material must be removed from the surface of the roadbed by the cutter 48. It can be seen that material removed from the surface of the roadbed is conveyed both to the left and righthand sides thereof. If an exceptionally deep cut must be taken in the roadbed, the front moldboard 68 is normally raised so that the only operation performed by the cutter members 50 and 52a is to trim the surface. With the moldboard 68 raised, dirt cut by the cutter 48 passes thereunder to the auger 62. The auger 62 conveys the dirt to either side of the roadbed as desired.

Figure 18:
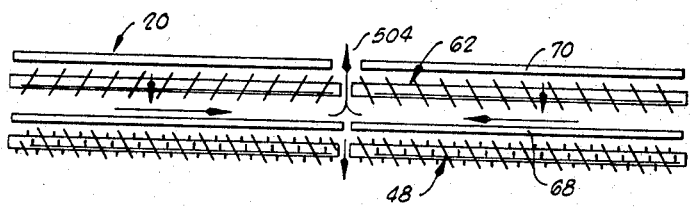

FIG. 18 illustrates schematically another slightly modified version of the machine 20 that can be used when the dirt removed by the machine 20 cannot be deposited on either side of the roadbed. As shown therein, the rear moldboard 70 has been modified to include a large opening 504 between the adjacent ends thereof. In operation, the front moldboard 68 is raised so that dirt removed by the cutter 48 passes directly to the auger 62. As the dirt engages the auger 62, which has both ends rotating in the same relative direction, it is moved between the rotating auger 62 and the moldboard 70 toward the center of the machine 20 where it is discharged through the opening 504.

One very important aspect of the invention lies in the ability of the construction machine 20 to load itself for transportation from one location on the job site to another and for transportation from one construction site to another. As described in connection with FIG. 5, the track support members 28, 30, 32 and 34 are pivotally connected with the central frame 22 by a removable pin 172. Also, each of the cylinders 176 is mounted in the frame 22 adjacent one of the track support members. The pistons 178 mounted in each of the cylinders 172 are attached to the adjacent track support member.

The central frame of the machine 20 can be raised relative to the surface of the roadbed by positioning the four-way valves 336 (see FIG. 11) so that the fluid flow therethrough is in the direction of the dash arrows shown therein. With the four-way valves 336 in this position, fluid flows from the pump 272 through the conduits 324 and 334 into the four-way valves 336. From the four-way valves 336, fluid flows through the conduits 342 into the safety valves 38, through the conduits 346 into the cylinders 176, driving the pistons 178 relatively outwardly. As the pistons 178 move outwardly, it can be seen in FIG. 5 that the track support members are rotated about the pivot pins 172, thereby lifting the central frame 22 relative to the roadbed. As the central frame 22 rises, the track assemblies 36 move relatively toward the track assemblies 38. Such movement is possible because the variable displacement hydraulic motors 246 have been placed in a condition wherein the tracks 220 on the track assemblies 36 are free to rotate.

When the central frame 22 has been lifted sufficiently high, transportation means such as the truck 510, illustrated in dash lines in FIG. 19, is positioned under the central frame 22. After the truck 510 has been positioned under the central frame 22, the four-way valves 336 are repositioned so that the fluid flows therethrough in the direction of the solid arrows shown in FIG. 11. With the four-way valves 336 in this position, fluid flows from the conduit 334 through the four-way valves 336 into the conduits 340 that are connected to the safety valves 338. From the safety valves 338, the fluid flows through conduits 344 into the cylinders 176 on the opposite side of the pistons 178, rotating the track support members about the pivot pins 172 so that the central frame 22 is lowered relative to the surface of the roadbed and onto the truck 510.

If the machine 20 is to be moved from one location on the job site to another, that is, moved only a relatively short distance, movement of the pistons 178 in the cylinders 176 is continued until the track support members reach the position illustrated in dash lines in FIG. 19. (It should be understood that all four of the track support members 28, 30, 32 and 34 will be raised to the position illustrated by the dash lines.) With the track support members in this position, the truck 510 transports the machine 20 to the new location. Upon reaching the new location, the aforedescribed procedure is reversed, the truck 510 driven out from under the central frame 22 and the machine 20 returned to the operation position as illustrated in FIGS. 1, 2 and 3.

If the machine 20 is to be moved to another job site, that is, for a relatively great distance, the central frame 22 is loaded on the truck 510, as previously described. However, after the frame 22 has been loaded on the truck 510, the pump 272 is stopped with the track assemblies 36 and 38 resting on the surface of the ground. The track support members 28, 30, 32 and 34 with their attached track assemblies 36 and 38 are then removed for loading on another truck (not shown) so that the entire machine 20 may be transported to the new job site.

Disconnecting the track support members is accomplished by removing the pivot pin 172 from each of the arms, disconnecting the piston 178 from each of the track support members, disconnecting the radius arms 218 from the steering arms 198 and disconnecting all hydraulic lines that extend into the track support members. Also, to protect the relatively delicate sensors 442, 448, and 484, they are preferably removed from the machine 20 during the time that it is being moved. In actual practice, the track support members 28, 30, 32 and 34 have been removed from the central frame 22 and the entire machine 20 loaded for transportation in less than one hour. Likewise, it takes less than one hour to unload, assemble, and place the machine 20 in operation after reaching the new job site.

The many advantages of a machine constructed in accordance with the invention are believed apparent from the foregoing detailed description. The invention provides an improved machine and method for constructing roadbeds quickly and efficiently. Also, the invention provides an improved machine that can be quickly and easily loaded for transportation. The invention also provides a new method for loading a machine for transportation.

It should be understood that the embodiment described in detail hereinbefore is presented by way of example only and that many changes and modifications can be made thereto without departing from the spirit of the invention or the scope of the annexed claims.

What we claim is:
1. A construction machine comprising:
   a central frame having front and rear sides;
   elongated rotatable cutter means which includes a helical vane and a plurality of cutter members affixed in a helical array displaced from said helical vane, said cutter being movably mounted on said frame adjacent and generally parallel to the front side;
   elongated front mold board means movably mounted on said frame parallel to and immediately to the rear of said cutter means to coact therewith;
   elongated rotatable auger means movably mounted on said frame generally parallel to said cutter means and between said front mold board means and rear side;
   front track support means having first and second ends, said first ends being connected with the front side of said frame;
   rear track support means having first and second ends and having its first ends connected with the rear side of said frame;
   track means supported on the second end of each of said track support means for movably supporting said machine; and
   power means on said frame and drivingly connected with said cutter means and auger means to rotate said cutter means and auger means.
2. A road construction machine comprising:
   a central frame having front and rear sides;
   elongated rotatable cutter means which includes a helical vane and a plurality of cutter members affixed in a helical array displaced from said helical vane, said cutter means being movably mounted on said frame adjacent and generally parallel to the front side;
   elongated front mold board means movably mounted on said frame parallel to and immediately to the rear of said cutter means to coact therewith;
   elongated rotatable auger means movably mounted on said frame generally parallel to said cutter means and between said front mold board and rear side;
   elongated rear mold board means movably mounted on said frame parallel to said cutter means and between said auger means and rear side;
   front track support means having first and second ends, said first ends being connected with the front side of said frame;
   rear track support means having first and second ends and having its first ends connected with the rear side of said frame;
   track means for movably supporting said machine connected to the second ends of each of said track support means; and
   power means located on said frame operably connected with said cutter means and auger means to rotate said cutter means and auger means.
3. The machine of claim 2 and also including:
   lift means connected with said frame and with said cutter means, auger means, and front and rear moldboard means for independently moving said auger means, cutter means and front and rear moldboard means relative to said frame;
   guide means connected with said frame and with said auger means, cutter means, and front and rear moldboard means for confining said movement to a vertical direction; and,
   adjustable stop means connected with said frame for selectively limiting the downward movement of said cutter means, auger means, and front and rear moldboard means relative to said frame.
4. The machine of claim 2 wherein each of said moldboard means includes:
   a pair of elongated members having a concave front surface and disposed in end-to-end relationship;
   means connecting the adjacent ends of said elongated members for simultaneous vertical movement;
   pump means mounted on said frame and drivingly connected with said power means;
   a hydraulic cylinder mounted on said frame and connected with said pump means, said cylinder having a reciprocal piston therein connected with the means connecting the adjacent end of said elongated members;
   a pair of hydraulic cylinders mounted on said frame and connected with said pump means, each of said cylinders, having a reciprocal piston therein connected with one of said elongated members;
   valve means interposed between said cylinders and pump means to control the flow of fluid to said cylinders; and,
   stop means on said frame for limiting the downward travel of said moldboard means.
5. The machine of claim 2 wherein said track means are pivotally mounted on said track support means and said machine also includes:
   a hydraulic pump mounted on said frame and drivingly connected with said power means;
   a pair of hydraulic cylinders connected with said pump and each having a reciprocal piston therein, one of said cylinders being mounted on the front side of said frame and the other said cylinder being mounted on the rear side of said frame;
   a plurality of steering arms, one of said steering arms being connected with each of said track means;
   an elongated, two-ended steering member slidingly mounted on the front side of said frame and having each end pivotally connected with one of said steering arms, said steering member further having a portion between its ends connected with the piston in said cylinder mounted on the front side of said frame;

a second elongated, two-ended steering member slidingly mounted on the rear side of said frame and having each end pivotally connected with one of said steering arms, said second steering member further having a portion between its ends connected with the piston in said cylinder mounted on the rear side of said frame; and, valve means connected between said pump means and cylinders to control the flow of fluid to said cylinders from said pump means.

6. The machine of claim 5 wherein said cylinders are each double-acting and wherein said valve means includes a four-way valve for each cylinder arranged to direct fluid from said pump means into said cylinders on either side of said piston, whereby said track means are caused to pivot in said support means to steer said machine.

7. The machine of claim 2 wherein said track support means are pivotally connected with said frame, and also including means for pivoting said support means relative to said frame, whereby said frame is moved vertically when said track means engage the ground.

8. The machine of claim 7 wherein said pivoting means includes:

pump means mounted on said frame and drivingly connected with said power means;

a hydraulic cylinder connected with said pump means and mounted on said frame adjacent each of said track support means, each cylinder having a reciprocal piston therein connected with the adjacent track support means relatively above the pivotal connection between said support means and frame, whereby movement of said pistons in said cylinders pivots said track support means relative to said frame to raise and lower said frame; and, valve means interposed between said cylinders and pump means to control the flow of fluid from said pump means to said cylinders.

9. The machine of claim 8 wherein said valve means includes:

a valve interposed between each of said cylinders and pump means to provide independent control of the fluid delivered by said pump means to each of said cylinders.

10. The machine of claim 8 wherein each of said cylinders is characterized as being double-acting and said valve means includes a four-way valve for each cylinder arranged to direct fluid from said pump means into said cylinders on either side of said pistons, whereby said frame can be raised and lowered relative to said track means.

11. The machine of claim 2 and also including means for moving said track means vertically relative to said track support means and frame, said means including:

pump means mounted on said frame and drivingly connected with said power means;

a hydraulic cylinder mounted on the second ends of each of said track support means and connected with said pump means, each said cylinder having a reciprocal piston therein connected with the respective track means; and, valve means interposed between said cylinders and pump means to control the flow of fluid from said pump means to said cylinders.

12. A self-propelled construction machine, comprising:
a central frame having front and rear sides;
elongated rotatable cutter means which includes a helical vane and a plurality of cutter members affixed in a helical array displaced from said helical vane, said cutter means being movably mounted on said frame adjacent and generally parallel to the front side thereof;

elongated front mold board means movably mounted on said frame and disposed parallel to and immediately to the rear of said cutter means to coact therewith;

elongated rotatable auger means movably mounted on said frame generally parallel to said cutter means and between said front mold board and rear side;

elongated rear mold board means movably mounted on said frame parallel to said cutter means and between said auger means and rear side;

a pair of spaced track support members each having first and second ends, said first ends being connected with the front side of said frame;

a second pair of spaced track support members having first and second ends, said first ends being connected with the rear side of said frame;

track means for propelling said machine located on the second ends of each of said support members; and, power means located on said frame operably connected with said cutter means, auger means, and track means to rotate said cutter and auger means and to drive said track means.

13. A self-propelled construction machine, comprising:
a central frame having front and rear sides;
power means mounted on said frame;
pump means mounted on said frame and drivingly connected to said power means;
elongated rotatable cutter means movably mounted on said frame adjacent and parallel to the front side thereof, said cutter means including
a pair of shafts disposed in end-to-end relationship,
a helical flight encircling each of said shafts,
a plurality of spaced cutter teeth projecting radially from each of said shafts and disposed in generally parallel relationship to said helical flights,
a pair of hydraulic motors mounted on said frame and operably connected with said pump means, one of said motors being drivingly connected with one of said shafts and the other said motor being drivingly connected with the other said shaft, and,
valve means interposed between said pump means and hydraulic motors to control the flow of fluid to said motors from said pump means;
elongated front moldboard means movably mounted on said frame and disposed parallel to said cutter means between said cutter means and rear side;
elongated rotatable auger means movably mounted on said frame and disposed parallel to said cutter means and between said front moldboard means and rear side, said auger means including
a second pair of shafts disposed in end-to-end relationship,
a helical flight encircling each shaft of said second pair of shafts,
a second pair of hydraulic motors mounted on said frame and operably connected with said pump means, one of said second pair of motors being drivingly connected with one of said second pair of shafts, and the other of said second pair of motors being drivingly connected with the other shaft of said second pair of shafts, and
second valve means interposed between said pump means and second pair of hydraulic motors to control the flow of fluid to said second pair of motors from said pump means;
elongated rear moldboard means movably mounted on said frame and disposed parallel to said cutter means and between said auger means and rear side, said front and moldboard means each including
a pair of elongated members having a concave front surface and disposed in end-to-end relationship, means connecting the adjacent ends of said elongated members for simultaneous vertical movement, a hydraulic cylinder mounted on said frame and connected with said pump means, said cylinder having a reciprocal piston therein connected with the means connecting the adjacent ends of said elongated members, a pair of additional hydraulic cylinders connected with said pump means and mounted on said frame, each of said additional cylinders having a reciprocal piston therein connected with one of said elongated members, third valve means interposed between said cylinders and pump means to control the flow of fluid to said cylinders, and stop means on said frame for limiting the downward travel of said front and rear moldboard means;

a first pair of spaced, elongated track support members having first and second ends, said first ends being pivotally connected to the front side of said frame for pivotation about a horizontal axis;

a second pair of spaced, elongated track support members having first and second ends, the first ends of said second pair of track support members being pivotally connected to the rear side of said frame for pivotation about a horizontal axis;

a plurality of hydraulic cylinders connected with said pump means, one of said plurality of cylinders being mounted on said frame adjacent each of said support members and each of the plurality of cylinders having a reciprocal piston therein connected with the first end of the adjacent track support member relatively above the pivotal connection;

fourth valve means interposed between said pump means and plurality of cylinders to control the flow of fluid from said pump means into said plurality of cylinders;

a plurality of track means operably connected with said pump means for propelling said machine, one of said plurality of track means being located on the second ends of each of said track support members, said track means being mounted on said support members for both pivotal and vertical movement relative thereto;

a steering arm connected with each of said track means;

a pair of steering members slidingly mounted on said frame, one of said steering members being located on the front side of said frame and the other steering member being located on the rear side of said frame, said steering member located on said front side being connected with the steering arms connected to the track means mounted on said first pair of track support member and said steering member located on said rear side being connected with the steering arms connected to the track means mounted on said second pair of track support members;

a second pair of hydraulic cylinders connected with said pump means, one of said second pair of cylinders being mounted on the front side of said frame and having a reciprocal piston therein connected with one of said steering members and the other cylinder of said second pair of cylinders being mounted on the rear side of said frame and having a reciprocal piston therein connected with the other steering member;

fifth valve means interposed between said pump means and second pair of cylinders for controlling the flow of fluid from said pump means into said second pair cylinders;

a hydraulic cylinder connected with said pump means and mounted on the second end of each of said track support members and having a reciprocal piston therein connected with each of said track means for moving said support members vertically relative to said track means; and, sixth valve means interposed between said pump means and cylinders mounted on said track support members for controlling the flow of fluid from said pump means into the cylinders mounted on said track support members.

14. In a road construction machine of the type having a central frame, a prime mover mounted on the central frame, ground-engaging track assemblies disposed on opposite sides of the central frame and earth cutting and leveling devices supported on the frame, the improvement which comprises:

elongated rotatable cutter means supported on the frame and positioned for engagement with the ground, said cutter means including a shaft carrying a coaxial helical flight and cutter teeth disposed helically thereon;

an elongated, vertically adjustable moldboard supported on the frame and extending parallel to, and substantially coextensive in length with said elongated, rotatable cutter means;

an elongated auger supported on said frame and extending parallel to said moldboard on the opposite side thereof from said rotatable cutter means; and, a second elongated moldboard supported on the frame and extending parallel to said auger on the opposite side thereof from said first mentioned moldboard.

15. The improvement claimed in claim 14 and further characterized to include adjustable dirt deflecting means supported on said frame and positioned adjacent one end of said second moldboard and adjustable in position from an angle to deflect dirt outwardly, to an angle to deflect dirt inwardly and into said elongated auger at one end thereof.

16. The improvement claimed in claim 14 wherein said rotatable cutter means, elongated auger and second elongated moldboard are movably mounted on said central frame for vertical movement toward and away from the ground; and further characterized to include selective adjusting means on said frame connected to said moldboards, said auger and said rotatable cutter means, and further connected to said prime mover and responsive thereto for independently and selectively adjusting the vertical positions of said moldboards, auger and cutter means relative to the ground.

17. In a method of preparing the surface of a roadbed to a reference elevation, the steps of:

trimming the surface extending above the reference elevation with a rotating cutter;

simultaneously conveying the material removed by the cutter to one side of the roadbed with the rotating cutter;

moving the trimmed material from said one side of the roadbed across the roadbed by means of a rotating auger to fill depressions in the surface below the reference elevation; and, removing excess material on the surface with a moldboard having the lower edge thereof set at the reference elevation.

18. In a method of preparing the surface of a roadbed to a reference elevation using a machine having a supporting frame, a rotatable cutter on the frame extending substantially across the roadbed, an elongated front moldboard movably mounted on the frame parallel to the cutter, an elongated rotatable auger on the frame disposed parallel to the front moldboard, and an elongated rear moldboard movably mounted on the frame parallel to the auger, the steps of:

positioning the cutter at the reference elevation;

rotating the cutter to trim the surface extending above the reference elevation;

positioning the front moldboard to cooperate with the cutter to convey the materials trimmed from the roadbed to one side thereof; and, simultaneously positioning the rear moldboard at the reference elevation and rotating the auger to convey the trimmed materials from said one side to the other side of the roadbed to fill depressions in the roadbed below the reference elevation and to remove any excess trimmed material, whereby the surface is at the reference elevation.

19. A road construction machine comprising:

a central frame having front and rear sides;

elongated rotatable cutter means movably mounted on said frame adjacent and generally parallel to the front side;

elongated moldboard means movably mounted on said frame parallel to said cutter means and between said cutter means and rear side;

elongated rotatable auger means movably mounted on said frame generally parallel to said cutter means and between said cutter means and rear side;

front track support means having first and second ends, said first ends being connected with the front side of said frame;

rear track support means having first and second ends, said first ends being connected with the rear side of said frame;

track means for movably supporting said machine connected to the second ends of each of said track support means;

power means located on said frame operably connected with said cutter means and auger means to rotate said cutter means and auger means;

lift means connected with said frame and with said cutter means, auger means and moldboard means for independently moving said auger means, cutter means and moldboard means relative to said frame;

guide means for directing the vertical movement of said cutter means, auger means, and moldboard means; and adjustable stop means connected to said frame for selectively limiting the downward movement of said cutter means, auger means and moldboard means relative to said frame.

20. The machine of claim 19 wherein said lift means comprises:

at least one hydraulic cylinder for each of said auger means, cutter means, and front and rear moldboard means, each of said cylinders being connected with said frame and having a reciprocal piston therein connected, respectively, with said auger means, cutter means, and front and rear moldboard means;

pump means mounted on said frame and drivingly connected with said power means, said pump means being operably connected with said hydraulic cylinders; and, valve means connected between said pump means and cylinders for controlling the flow of fluid to said cylinders from said pump means to raise and lower said auger means, cutter means, and front and rear moldboard means independently.

21. The machine of claim 19 wherein said cutter means includes:

a pair of shafts disposed in end-to-end relationship;

a helical flight encircling each of said shafts; and, a plurality of spaced cutter teeth projecting radially from each of said shafts and disposed in generally parallel relationship with said helical flights.

22. The machine of claim 21 wherein the helical flights are wound on said shafts in opposite directions.

23. The machine of claim 21 and also including:

pump means mounted on said frame drivingly connected with said power means;

a pair of hydraulic motors mounted on said frame and operably connected with said pump means, one of said motors being drivingly connected with one of said shafts and the other said motor being drivingly connected with the other said shaft; and, valve means connected between said pump means and hydraulic motors to control the flow of fluid to said motors from said pump means.

24. The machine of claim 19 wherein said auger means includes:

a pair of shafts disposed in end-to-end relationship; and, a helical flight encircling each of said shafts.

25. The machine of claim 24 and also including:

pump means mounted on said frame drivingly connected with said power means;

a pair of hydraulic motors mounted on said frame and operably connected with said pump means, one of said motors being drivingly connected with one of said shafts and the other said motor being drivingly connected with the other said shaft; and, valve means connected between said pump means and hydraulic motors to control the flow of fluid to said motors from said pump means.

26. A road construction machine as set forth in claim 19 which is further characterized to include:

front hydraulic cylinder means connected between said central frame front side and said front track support means, said front hydraulic cylinder means being energizable to cause said front track support means to tilt upward thereby to raise said central frame front side;

rear hydraulic cylinder means connected between said central frame rear side and said rear track support means and being energizable to cause said rear track support means to tilt upward thereby to raise said central frame rearside, whereby said central frame is raised up sufficiently to receive a transporting device thereunder.

27. A road construction machine as set forth in claim 26 wherein said power means can be operated to drive each track means toward the central frame such that respective front and rear track support means are caused to tilt upward to raise the central frame into position for receiving a transporting device thereunder.

References Cited

UNITED STATES PATENTS

| | | | |
|---|---|---|---|
| 1,103,242 | 7/1914 | Akins | 37—108 |
| 1,904,948 | 4/1933 | Maxon et al. | 37—108 |
| 2,072,150 | 3/1937 | Baker | 37—108 |
| 2,114,434 | 4/1938 | Spencer | 37—108 |
| 2,304,622 | 12/1942 | Barrett | 214—515 |
| 2,310,930 | 2/1943 | Blanchett | 280—6.1 |
| 3,080,196 | 3/1963 | Darby. | |
| 3,183,016 | 5/1965 | Gustafsson | 280—6.1 |
| 3,230,846 | 1/1966 | Curlett et al. | 280—6.1 X |
| 3,243,193 | 3/1966 | Fulmer et al. | 280—43.23 X |
| 3,257,917 | 6/1966 | Lewis | 94—46 X |

OTHER REFERENCES

Publication "Antograde," by Concrete Machinery Inc.; 1400 Exchange; Oklahoma City, Okla.

ABRAHAM S. STONE, *Primary Examiner.*

ALAN E. KOPECKI, *Assistant Examiner.*

U.S. Cl. X.R.

37—190, 195